US008442529B2

(12) United States Patent
Patil et al.

(10) Patent No.: US 8,442,529 B2
(45) Date of Patent: May 14, 2013

(54) METHODS AND APPARATUS FOR MAKING HANDOFF DECISIONS IN ACCESS TERMINALS CAPABLE OF OPERATING AT DIFFERENT TIMES IN BEST EFFORT AND QOS MODES OF TRAFFIC OPERATION

(75) Inventors: Shailesh Patil, Birdgewater, NJ (US); Prashanth Hande, Somerset, NJ (US); Hyung Myung, West New York, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1211 days.

(21) Appl. No.: 12/049,088

(22) Filed: Mar. 14, 2008

(65) Prior Publication Data

US 2009/0154425 A1 Jun. 18, 2009

Related U.S. Application Data

(60) Provisional application No. 61/013,621, filed on Dec. 13, 2007, provisional application No. 61/013,624, filed on Dec. 13, 2007, provisional application No. 61/026,980, filed on Feb. 7, 2008.

(51) Int. Cl.
*H04W 36/00* (2009.01)
*H04W 4/00* (2009.01)

(52) U.S. Cl.
USPC .......................................... 455/436; 370/331

(58) Field of Classification Search .......... 455/436–444; 370/331, 252, 235, 332, 338, 468, 328, 329
See application file for complete search history.

(56) References Cited

U.S. PATENT DOCUMENTS

| 7,400,901 B2 * | 7/2008 | Kostic et al. .................. 455/525 |
| 2003/0144018 A1 | 7/2003 | Minnick et al. |
| 2004/0203827 A1 * | 10/2004 | Heiner et al. .............. 455/452.1 |

(Continued)

FOREIGN PATENT DOCUMENTS

| CN | 1731889 A | 2/2006 |
| CN | 1913468 A | 2/2007 |

(Continued)

OTHER PUBLICATIONS

International Search Report and the Written Opinion—PCT/US2009/032806, International Search Authority—European Patent Office—May 18, 2009.

(Continued)

*Primary Examiner* — Michael Faragalla
(74) *Attorney, Agent, or Firm* — Donald C. Kordich

(57) ABSTRACT

Methods and apparatus for making handoff decisions in an access terminal which can support both best effort and QoS traffic, e.g., when operating in a best effort and QoS mode of operation, respectively, are described. The access terminal receives an indicator indicating the fraction of communications resources not utilized for QoS service and information indicating a number of best effort users being supported by the attachment point. During QoS mode operation, connections to attachment points which can support the access terminal's minimal QoS requirements are identified and then from among the identified set, the attachment point which can provide a connect supporting the most best effort traffic from the access terminal is selected. In best effort mode operation the access terminal selects the attachment point connection which will provide the greatest amount of throughput to the access terminal for best effort traffic.

34 Claims, 13 Drawing Sheets

U.S. PATENT DOCUMENTS

| | | | |
|---|---|---|---|
| 2007/0008902 A1* | 1/2007 | Yaramada et al. | ............ 370/252 |
| 2007/0010251 A1 | 1/2007 | Cho et al. | |
| 2009/0156211 A1 | 6/2009 | Hande et al. | |

FOREIGN PATENT DOCUMENTS

| | | | |
|---|---|---|---|
| EP | 1156623 A1 | 11/2001 | |
| EP | 1227692 A1 | 7/2002 | |
| EP | 1679921 A1 | 7/2006 | |
| EP | 1841262 A1 | 10/2007 | |
| FR | 2900787 | 11/2007 | |
| JP | 2002359864 A | 12/2002 | |
| JP | 2005027313 A | 1/2005 | |
| JP | 2005033285 A | 2/2005 | |
| JP | 2005229417 A | 8/2005 | |
| JP | 2006135881 A | 5/2006 | |
| JP | 2007180729 A | 7/2007 | |
| KR | 20070006383 A | 1/2007 | |
| RU | 2180159 | 2/2002 | |
| WO | WO9814026 | 4/1998 | |
| WO | 2007047502 A1 | 4/2007 | |
| WO | WO 2007/047502 | * | 4/2007 |
| WO | WO2007047669 | 4/2007 | |

OTHER PUBLICATIONS

International Search Report and the Written Opinion—PCT/US2008/086640, International Search Authority—European Patent Office—Apr. 27, 2009.

Taiwan Search Report—TW097148705—TIPO—Jul. 13 2012.

* cited by examiner

METHODS AND APPARATUS FOR MAKING HANDOFF DECISIONS IN ACCESS TERMINALS CAPABLE OF OPERATING AT DIFFERENT TIMES IN BEST EFFORT AND QOS MODES OF TRAFFIC OPERATION

RELATED APPLICATIONS

The present application claims the benefit of U.S. Provisional Application Ser. No. 61/013,621 filed Dec. 13, 2007, U.S. Provisional Application Ser. No. 61/013,624 filed on Dec. 13, 2007; and U.S. Provisional Application Ser. No. 61/026,980 filed Feb. 7, 2008. Each of the above identified patent applications are hereby expressly incorporated by reference in their entirety.

FIELD

Various embodiments relate to wireless communications, and more particularly, to methods and apparatus for making a handoff decision in wireless communications devices supporting best effort and quality of service mode of traffic operation.

BACKGROUND

In various wireless communications systems a number of different base station attachment points may be available to an access terminal at the same time. Some of the different available base station attachment points may correspond to different carriers and/or sectors. Communications capabilities between the access terminal and the different available attachment points can be expected to be different for different attachment points at different times, e.g., as a function of access terminal location, transmission signal strength, channel gain, interference, noise, etc. In addition attachment point loading conditions can be expected to vary throughout the system and over time.

Different end users in a wireless communications system will typically have different needs, e.g., depending on the amount of traffic, type of traffic and/or device capabilities. In addition different end users may be contracted to be provisioned differently, from a service provider perspective. Different data rate requirements and/or different latency requirements may correspond to different users at a given time.

It is desirable to be able to efficiently utilize the available air link resources in a system including multiple alternative attachment points to maximize throughput and enhance user experience. Load balancing in such a system is an important consideration. There is a need for a handoff mechanism that facilitates load balancing in a wireless communications system while taking into effect different device needs and/or different service levels. A centralized system control node approach to load balancing may not be practical or efficient to implement, e.g., due to system architecture, control signaling overhead and/or control signaling delays.

A mobile access terminal may be in the best situation to evaluate its current channel conditions with respect to potential alternative attachment points. Based on the above discussion, there is a need for novel access terminal based handoff decision methods and apparatus which facilitate load balancing in a wireless communications systems. For an access terminal to make intelligent handoff decisions which contribute to load balancing it would be advantageous if additional base station information was available. Accordingly, there is a need for novel base station methods and apparatus which provide information facilitating access terminal based handoff decisions and system load balancing.

SUMMARY

Methods and apparatus for making handoff decisions in an access terminal, e.g., wireless mobile node, which can support both best effort and QoS traffic, e.g., when operating in a best effort and QoS mode of operation, respectively, are described. The access terminal receives an indicator indicating the fraction of communications resources not utilized for QoS service and information indicating a number of best effort users being supported by the attachment point. During QoS mode operation, connections to attachment points which can support the access terminal's minimal QoS requirements are identified and then from among the identified set, the attachment point which can provide a connection supporting the most best effort traffic for the access terminal is selected. In best effort mode operation the access terminal selects the attachment point connection which will provide the greatest amount of throughput to the access terminal for best effort traffic.

An exemplary method of making handoff determinations in an access terminal, in accordance with some embodiments, comprises: receiving for each of a plurality of attachment points, an indicator for the individual attachment point indicating a fraction of communications resources available at said attachment point not utilized for QoS service; and making a handoff decision based on the received indicators corresponding to different attachment points.

An exemplary access terminal, in accordance with some embodiments, comprises: a wireless receiver for receiving for each of a plurality of attachment points, an indicator for the individual attachment point indicating a fraction of communications resources available at said attachment point not utilized for QoS service; and a handoff decision module for making a handoff decision based on the received indicators corresponding to different attachment points.

An exemplary method of operating a base station, in accordance with various embodiments, comprises: generating an indicator for an individual attachment point included in said base station, said indicator indicating a fraction of communications resources available at said attachment point not utilized for QoS service; and transmitting a signal conveying said generated indicator over the air.

An exemplary base station, in some embodiments, comprises: a indicator of resource fraction generation module for generating an indicator for an individual attachment point included in said base station, said indicator indicating a fraction of communications resources available at said attachment point not utilized for QoS service; a wireless transmitter module for transmitting signals over the air; and an indicator of resource fraction signal transmission control module for controlling transmission of a signal conveying said generated indicator over the air.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
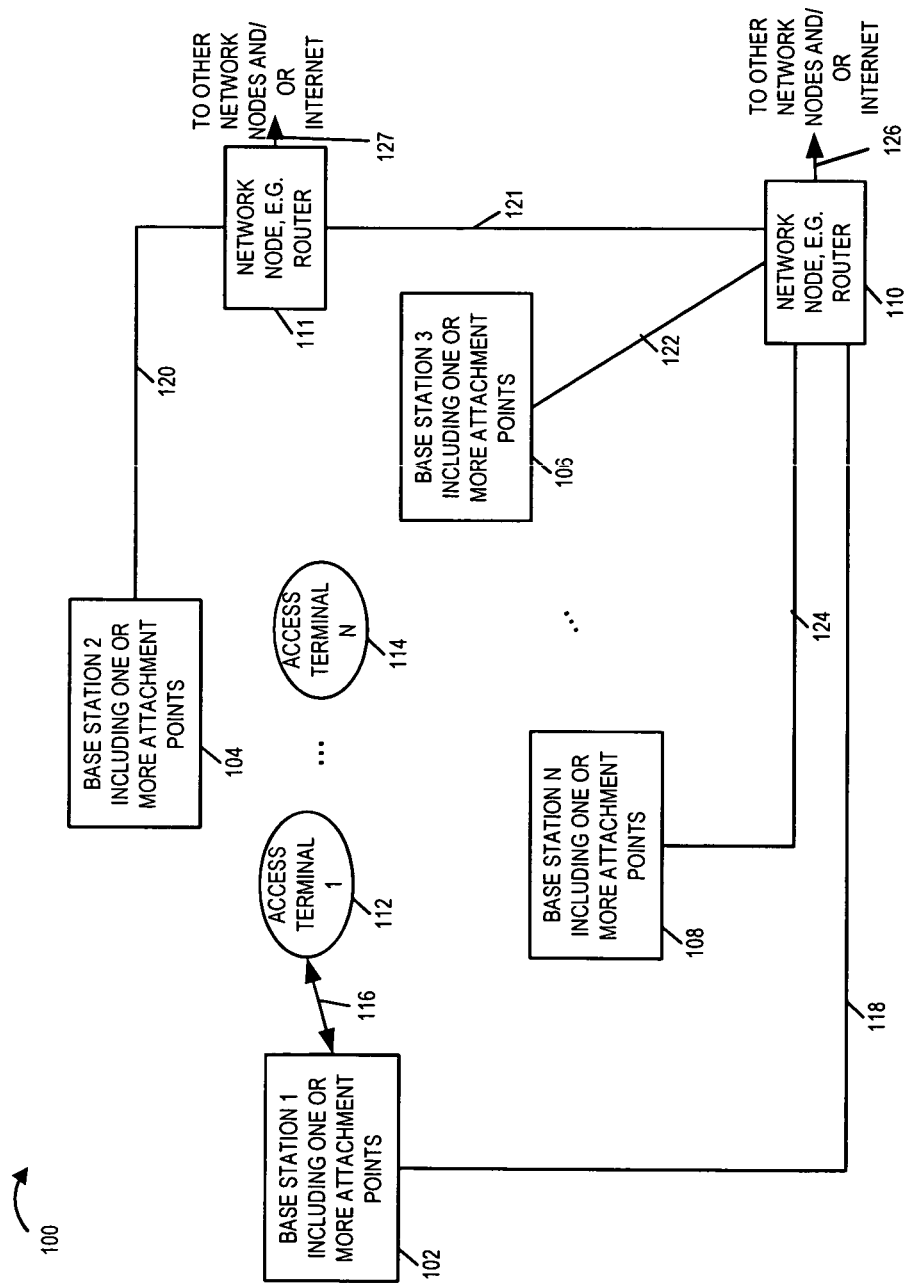
FIG. 1 is a drawing of an exemplary wireless communications system in accordance with an exemplary embodiment.

FIG. 1 is a drawing of an exemplary wireless communications system 100 in accordance with an exemplary embodiment. Exemplary wireless communications system 100 includes a plurality of base stations (base station 1 102, base station 2 104, base station 3 106, . . . , base station N 108) and a plurality of other network nodes, e.g., routers, (110, 11 1). Base stations (102, 106, 108) are coupled to network node 110 via network links (118, 122, 124), respectively. Base station 104 is coupled to network node 111 via network link 120. Network nodes (110, 111) are coupled to each other via network link 121 and are coupled to other network nodes, e.g., other base stations, routers, AAA nodes, home agent nodes, etc. and/or the Internet via network links (126, 127), respectively. The network links (118, 120, 121, 122, 124, 126, 127), are, e.g., fiber optic links. Other network topologies are possible and are used in the backhaul network in other embodiments.

The wireless communications system 100 also includes a plurality of access terminal (access terminal 1 112, . . . , access terminal N 114). An access terminal is, e.g., a wireless terminal such as a wireless mobile node which may move throughout the system and establish and maintain a wireless communications connection with an attachment point of a base station. Access terminals (112, . . . , 114) support best effort and quality of service (QoS) mode of traffic operation. Access terminal 1 112 currently has a wireless connection with an attachment point of base station 1 112; access terminal 1 112 makes at least some handoff decisions, based on received attachment point fractional communications resource availability indicators. Some handoff decisions are made as a function of received power level indicator signals, received information indicating numbers of best effort users and fractional communications resource availability indicators. In some embodiments, handoff decisions are performed differently depending upon whether the access terminal is in a best effort mode or QoS mode.

Each base station includes one or more attachment points. An attachment point corresponds to a base station, base station sector and carrier combination. Various types of base stations are possible including single sector single carrier base stations, single sector multiple carrier base stations, multi-sector single carrier base station, multi-sector multi-carrier base stations using a single carrier per sector, multi-sector multi-carrier base stations using one or more carriers per sector, and multi-sector multi-carrier base stations using multiple carriers per sector.

Figures 2, 2A, 2B:
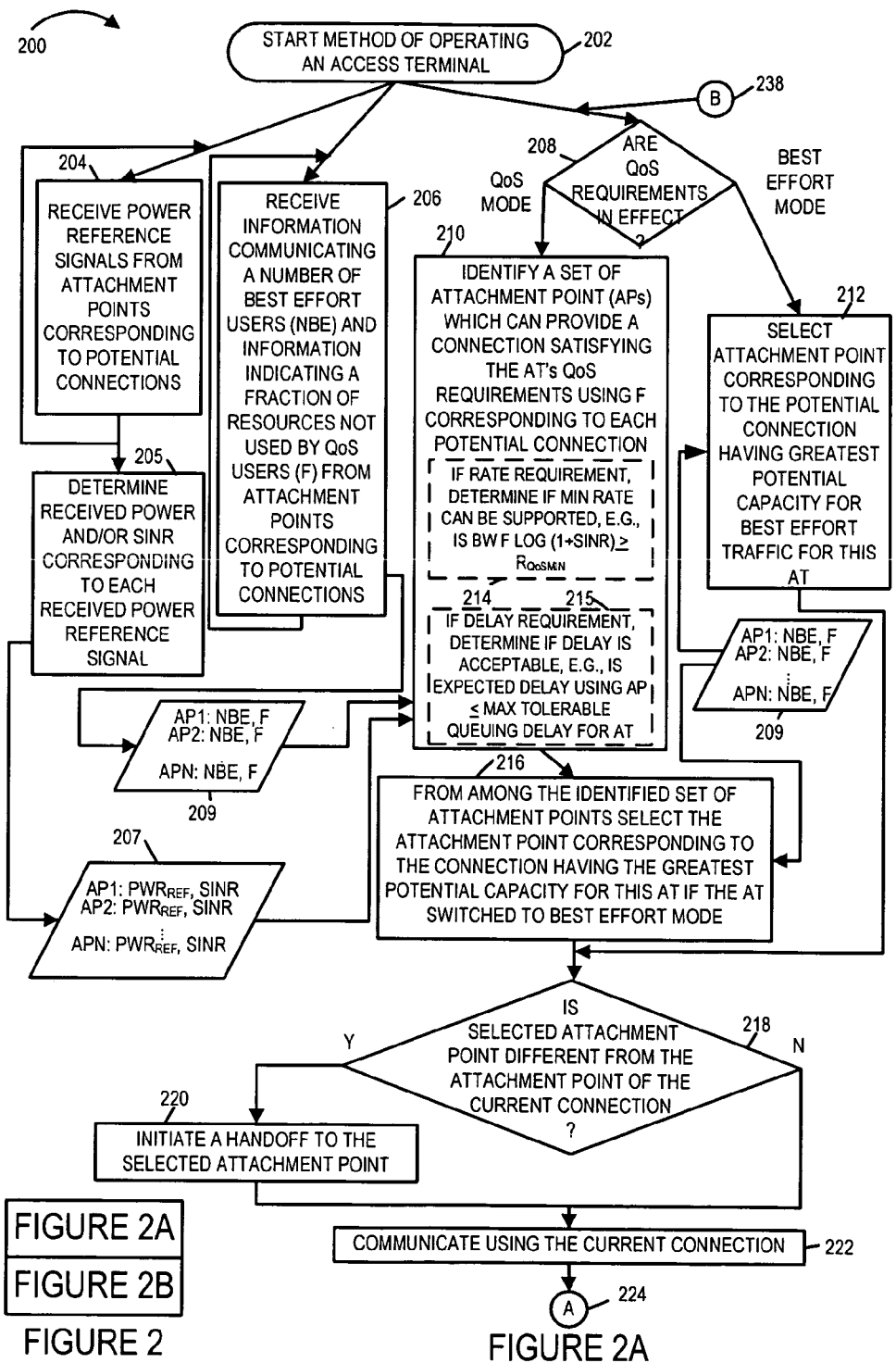
FIG. 2 is a flowchart of an exemplary method of operating an access terminal, e.g., a wireless terminal such as a mobile node, in accordance with an exemplary embodiment.
Figure 2B:
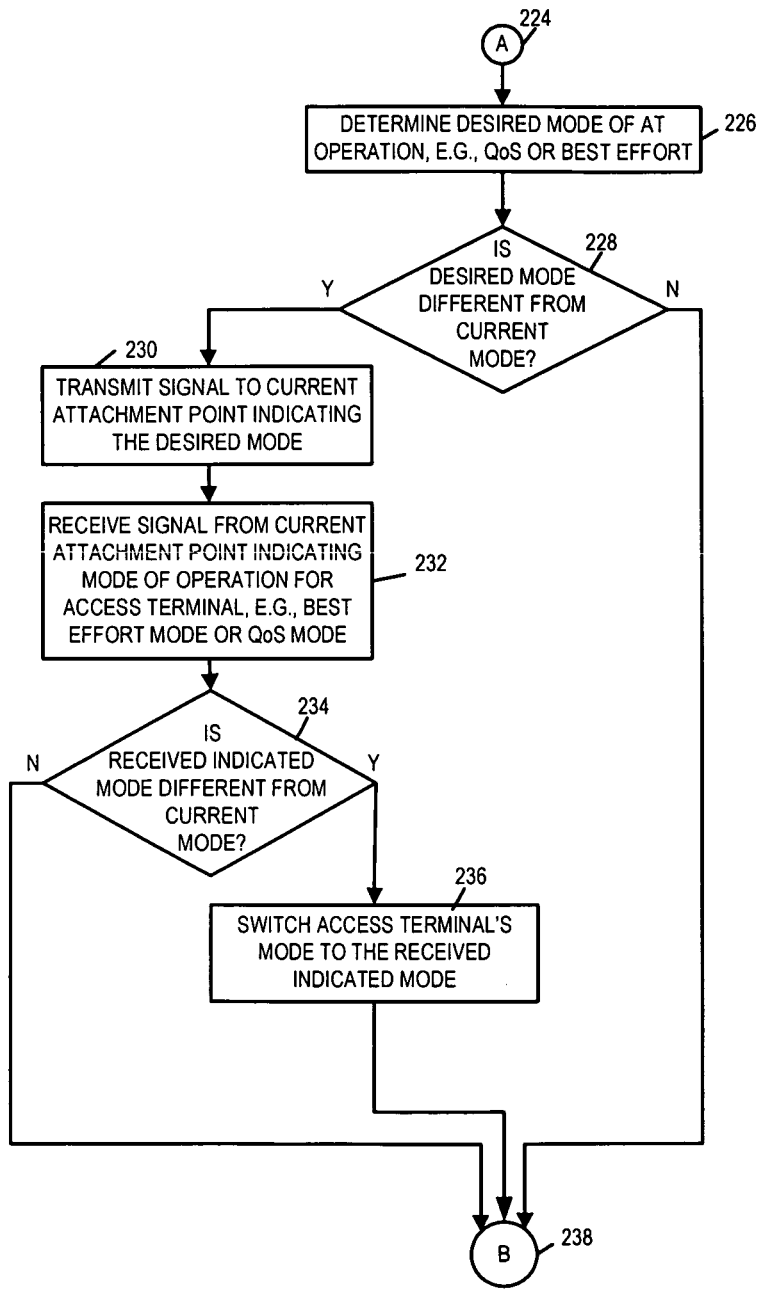

FIG. 2 is a flowchart 200 of an exemplary method of operating an access terminal, e.g., a wireless terminal such as a mobile node, in accordance with an exemplary embodiment. Operation of the exemplary method starts in step 202, where the access terminal is powered on and initialized and proceeds to steps 204, 206 and 208, which may be performed in parallel.

In step 204, which is performed on an ongoing basis, the access terminal receives power reference signals from attachment points corresponding to potential connections. The power reference signals are, e.g., beacon signals transmitted at predetermined know powers. Operation proceeds from step 204 to step 205 in which the access terminal determines received power and/or SINR corresponding to each received power reference signal. Information 207, including sets of information corresponding to different attachment points corresponding to potential connection (AP1: $PWR_{REF}$, SINR; AP2: $PWR_{REF}$, SINR; . . . ; APN: $PWR_{REF}$, SINR), is an output of step 205 and used as an input to step 210. In some embodiments, information 207 is also used as an input to one or more of steps 212 and 216.

In step 206, which is performed on an ongoing basis, the access terminal receives information communicating a number of best effort users (NBE) and information indication a fraction of resources not used by Quality of Service (QoS) users (F) from attachment points corresponding to potential connections. Information 209, including sets of information corresponding to different attachment points corresponding to potential connections (AP1: NBE, F; AP2: NBE, F; . . . ; APN: NBE, F), is an output of step 206 and used as an input to step 210, 212 and 216.

In some embodiments, the information indicating a fraction of the communications resources not used for QoS service for an individual attachment point is an indicator and the communications resource is time, frequency, and/or space at the AP. In some embodiments, the communications resources are for communicating traffic data.

In step 208 the access terminal determines whether or not QoS requirements are in effect for the access terminal. If the access terminal is in QoS mode, then operation proceeds from step 208 to step 210; however, if the access terminal is in best effort mode, then operation proceeds from step 208 to step 212.

In step 210, the access terminal identifies a set of attachment points (APs) which can provide a connection satisfying the AT's QoS requirements using the fraction (F) corresponding to each potential connection. In some embodiments, a rate requirement, e.g., a minimum data rate requirement, is included as part of the QoS requirements, and the access terminal performs sub-step 214, and the access terminal determines, for each attachment point being considered, if a minimum acceptable data rate can be supported. For example, the access terminal checks if: (Bandwidth for the attachment point)×(fraction of resources not used by QoS user for the attachment point)×(scaling factor which is a function of noise and interference) is greater than or equal to (a specified minimum data rate for supporting the QoS requirement). In one example, the check tests if BW F Log $(1+SINR) \geq R_{QoSMIN}$. The Signal to Interference plus Noise Ratios (SINRs) for the access terminal are determined using measurements of the received reference power signals of step 204.

In some embodiments, a QoS requirement used in step 210 is a maximum queuing delay requirement indicating a maximum time data can be stored in a queue prior to transmission. In some such embodiments, sub-step 215 is performed in which the access terminal determines an estimated queuing delay for using an attachment point and compares the estimated queuing delay to a maximum tolerable queuing delay for data to be transmitted. If the expected delay when using the attachment point is less than or equal to the maximum tolerable queuing delay from a QoS perspective of the access terminal, the attachment point satisfies the requirement. In some embodiments, for an attachment point to be included in the identified set of attachments points satisfying the AT's QoS requirements, which is an output of step 210 and an input to step 216, both a rate requirement and a delay requirement need to be satisfied. In some other embodiments, one of a rate requirement and a delay requirement, but not necessarily both, are evaluated and used to identify the set of attachment points which can provide a connection satisfying the AT's QoS requirements.

Operation proceeds from step 210 to step 216. In step 216, the access terminal selects, from among the set of identified attachment points, the attachment point corresponding to the connection having the greatest potential capacity for this access terminal if the access terminal switched to best effort mode. Operation proceeds from step 216 to step 218.

Returning to step 212, in step 212, the access terminal selects the attachment point corresponding to the potential connection having the greatest potential capacity for best effort traffic for this access terminal. Operation proceeds from step 212 to step 218.

In step 218, the access terminal determines if the selected attachment point, from the selection of step 216 or 212, different from the attachment point of the current connection. If the selected attachment point is different from the current attachment point, then operation proceeds from step 218 to step 220; otherwise operation proceeds to step 222.

Returning to step 220, in step 220, the access terminal initiates a handoff to the selected attachment point. Thus step 220 changes the current connection attachment point to the new selected attachment point. Operation proceeds from step 220 to step 222, in which the access terminal communicates using the current connection. Operation proceeds from step 222 to step 226, via connecting node A 224.

In step 226, the access terminal determines the desired mode of access terminal operation, e.g., QoS mode or Best Effort mode. Then, in step 228, the access terminal determines whether or not the desired mode of access terminal operation is different from the current mode of access terminal operation. If the desired mode of access terminal operation is different from the current mode of access terminal operation, then operation proceeds from step 228 to step 230; otherwise, operation proceeds from step 228 to connecting node B 238.

Returning to step 230, in step 230 the access terminal transmits a signal to the current attachment point indicating the desired mode. Then, in step 232, the access terminal receives a signal from the current attachment point indicating a mode of operation for the access terminal, e.g., best effort mode or QoS mode. Operation proceeds from step 232 to step 234. In step 234 the access terminal determines whether or not the received indicated mode is different from the current mode. If the received indicated mode is different from the current mode, then operation proceeds from step 234 to step 236; otherwise, operation proceeds from step 234 to connecting node B 238.

Returning to step 236, in step 236 the access terminal switches the AT's operational mode to the received indicated mode. Operation proceeds from step 236 to connecting node B 238. Operation proceeds from connecting node B 238 to the input of step 208.

Figure 3:
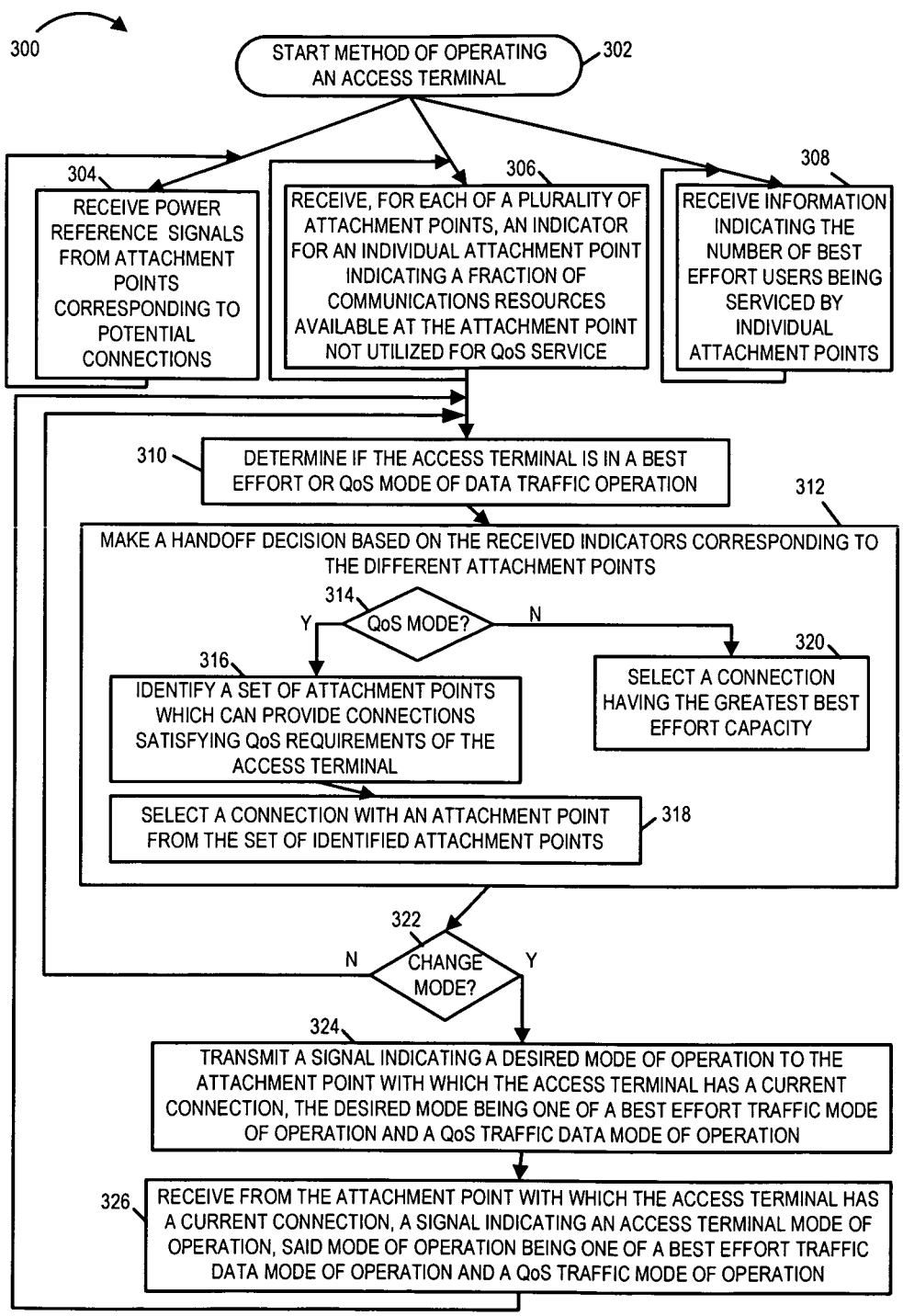
FIG. 3 is a flowchart of an exemplary method of making handoff decisions in an access terminal, e.g., a wireless terminal such as a mobile node, in accordance with an exemplary embodiment.

FIG. 3 is a flowchart 300 of an exemplary method of operating an access terminal, e.g., a wireless terminal such as a mobile node, to make handoff decisions in accordance with an exemplary embodiment. Operation of the exemplary method starts in step 302 where the access terminal is powered on and initialized and proceeds to steps 304, 306 and 308.

In step 304, which is performed on a recurring basis, the access terminal receives power reference signals from attachment points corresponding to potential connections. The received power reference signals are, e.g., beacon signals such as OFDM beacon signals or pilot signals such as CDMA pilot signals, which were transmitted at known power levels. In step 306, which is performed on a recurring basis, the access terminal receives, for each of a plurality of attachment points, an indicator for an individual attachment point indicating a fraction of communications resources available at the attachment point not utilized for QoS service. The communications resources are time, frequency, and/or space. In some embodiments, the communications resources are communications resources which are for communicating traffic data, e.g., traffic segments in a time/frequency structure. In step 308, which is performed on an ongoing basis, the access terminal receives information indicating the number of best effort users being serviced, e.g. at the present time, by individual attachment points.

In some embodiments, an attachment point broadcasts its own indicator of communications resource fraction value. In some embodiments, an attachment point broadcasts its own indicator of communications resource fraction and indicators of communications resource fractions corresponding to other attachment points, e.g., one indicator per other attachment point. The other attachment points are, e.g., adjacent attachment points. In some embodiments, an attachment point broadcasts information indicating the number of best effort users being serviced by itself. In some embodiments, an attachment point broadcasts information indicating the number of best effort users being serviced by itself and information indicating the number of best effort users being serviced by other attachment points, e.g., adjacent attachment points.

From the access terminal's perspective, particularly if the access terminal is of a single RF front end type, it is beneficial for a base station attachment point to transmit indicators of resource fractions and/or number of best effort users information corresponding to itself and other attachment points in the local vicinity. Therefore, the access terminal can receive such information from its current connection without having to retune and/or resynchronize to transmission from other attachment points. Power reference signals can be, and sometimes are, signals with special characteristics, e.g., high power, single tone or a few tones, wider symbol transmission time interval, etc., which facilitate easy detect and recovery from different base station attachment points. Therefore, in some embodiments, the access terminal receives power reference signals in step 304 from its current attachment point and from possible alternative attachment points, while the access terminal receives from its current attachment point signals conveying indicators of resource fractions and best effort users number information corresponding to both the current attachment point and other local vicinity attachment points.

Operation proceeds from step 306 to step 310. In step 310 the access terminal determines if the access terminal is in a best effort or QoS mode of data traffic operation. Operation proceeds from step 310 to step 312.

In step 312, the access terminal makes a handoff decision based on the received indicators corresponding to the different attachment points. In some embodiments, the handoff decision also uses one or more of receive power reference signal measurement information, e.g., in an SINR determination or received power level comparison, and/or received information indicating the number of best effort users being serviced by an attachment point. Step 312 includes sub-steps 314, 316, 318 and 320. In sub-step 314 the access terminal proceeds to different sub-steps as a function of the whether or not the access terminal is in QoS mode. If the access terminal is in QoS mode, then operation proceeds from sub-step 314 to sub-step 316; otherwise, operation proceeds from sub-step 314 to sub-step 320.

In sub-step 316, the access terminal identifies a set of attachment points which can provide connections satisfying the QoS requirements at the access terminal. In various embodiments, a QoS requirement used in sub-step 316 is a minimum data rate requirement. In some embodiments a QoS requirement used in sub-step 316 is a maximum queuing delay indicating a maximum time data can be stored in a queue prior to transmission. In some embodiments, the step of identifying attachment points which can provide connections satisfying QoS requirements is based on the communicated indicated fraction of communications resources available at the attachment point not utilized for QoS service corresponding to each individual attachment point which is under consideration for inclusion in the set. In one exemplary embodiment, sub-step 316 checks if an attachment point satisfies the access terminal's QoS requirements by checking: is $BW(F) \log(1+SINR) > R_Q$?, where BW is the communications resource bandwidth of the attachment point under consideration, F is the fraction of the communications resource available at the attachment point not utilized for QoS service, where SINR is an access terminal determined signal to interference plus noise ratio corresponding to the attachment point, and where $R_Q$ is a minimum quality of service data rate requirement for the access terminal.

Then in sub-step 318 the access terminal selects a connection with an attachment point from the set of identified attachment points of sub-step 316. In some embodiments, selecting a connection with an attachment point from the set of identified attachment points includes selecting the connection having the greatest capacity available for communicating best effort traffic between the access terminal and the attachment point corresponding to the selected connection. In some embodiments, selecting a connection with an attachment point from the set of identified attachment points includes selecting as a function of the number of best effort users being serviced by each of the individual attachment points. In some embodiments, selecting a connection with an attachment point from the set of identified attachment points includes selecting the attachment point having the largest capacity after satisfying QoS requirements. For example, the access terminal chooses to use the attachment point with the largest $(BW)(F)\log(1+SINR)$ determined value among those alternative attachment points which satisfied the requirement of sub-step 316.

Returning to sub-step 320, in sub-step 320, the access terminal selects a connection having the greatest best effort capacity. Operation proceeds from step 312 to step 320.

In step 320, the access terminal decides if it wants to change its current mode. If the access terminal wants to change its current mode, then operation proceeds to step 324; otherwise operation proceeds back to the input of step 310. In step 324, the access terminal transmits a signal indicating a desired mode of operation to the attachment point with which the access terminal has a current connection, the desired mode being one of a best effort traffic mode of operation and a QoS traffic data mode of operation. Then, in step 326, the access terminal receives from the attachment point with which the access terminal has a current connection, a signal indicating an access terminal mode of operation, said mode of operation being one of a best effort traffic data mode of operation and a QoS traffic data mode of operation. Operation proceeds from step 326 to the input of step 310.

Figure 4:
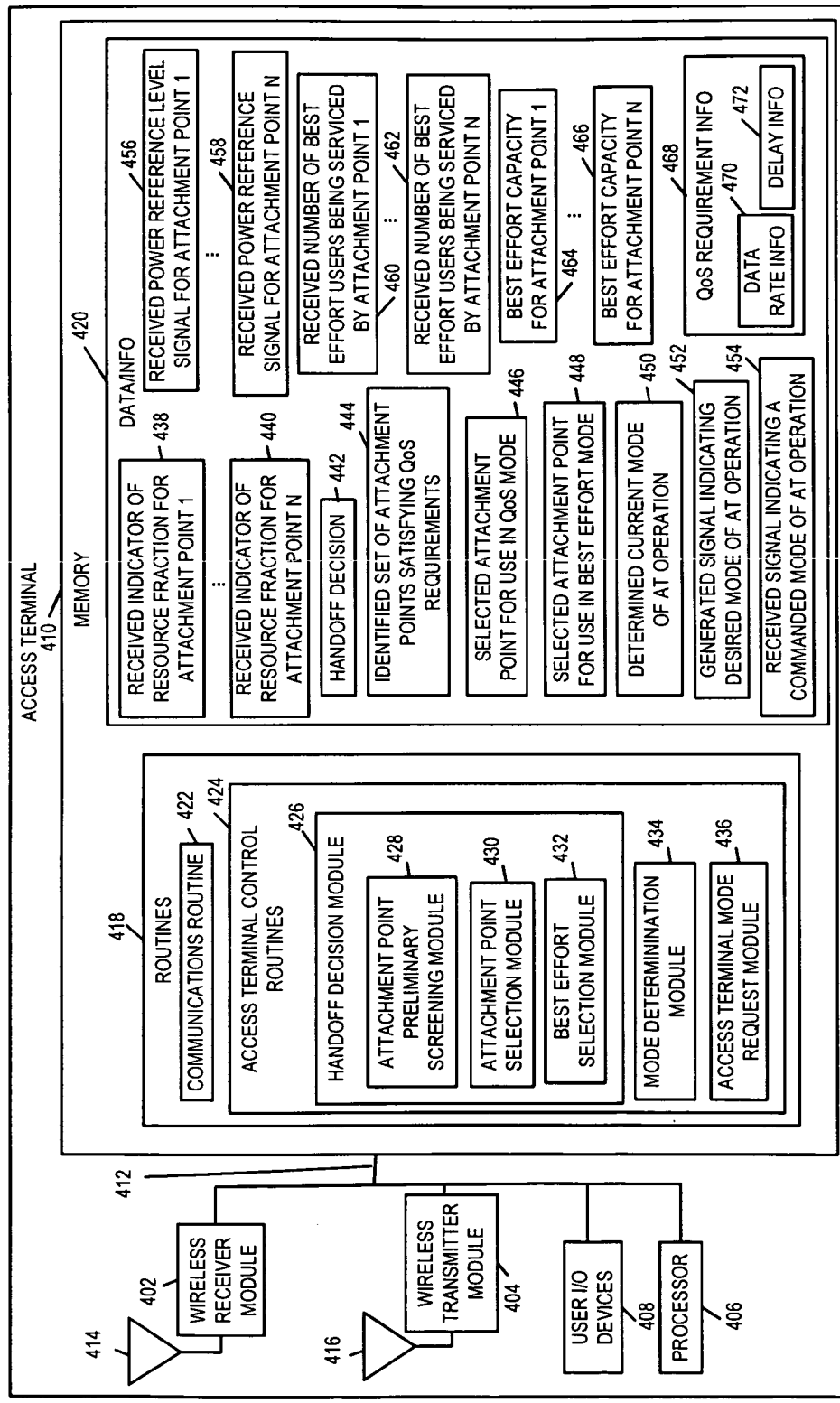
FIG. 4 is a drawing of an exemplary access terminal, e.g., a wireless mobile node, in accordance with an exemplary embodiment.

FIG. 4 is a drawing of an exemplary access terminal 400, e.g., a wireless mobile node, in accordance with an exemplary embodiment. Exemplary access terminal 400 includes a wireless receiver module 402, a wireless transmitter module 404, a processor 406, user I/O devices 408 and a memory 410 coupled together via a bus 412 over which the various elements may interchange data and information.

Memory 410 includes routines 418 and data/information 420. The processor 406, e.g., a CPU, executes the routines 418 and uses the data/information 420 in memory 410 to control the operation of the access terminal 400 and implement methods, e.g., the method of flowchart 200 of FIG. 2 or flowchart 300 of FIG. 3.

User I/O devices 408 include, e.g., a microphone, a keypad, a keyboard, switches, a camera, a speaker, a display, etc. User I/O devices 408 allow a user of access terminal 400 to input data/information, access output data/information, and control at least some function of the access terminal 400.

Wireless receiver module 402, e.g., an OFDM receiver, is coupled to receive antenna 414 via which the access terminal 400 receives signals, e.g., downlink signals from attachment points. Received signals include, e.g., a power reference signal, e.g., a beacon and/or pilot signal, a broadcast signal communicating a number of best effort users being service by the attachment point, a broadcast signal communicating an indicator for the individual attachment point indicating a fraction of communications resources available at the attachment point not utilized for QoS service, access terminal mode command signals, and traffic channel signals. Information is obtained from received power reference signals received by wireless receiver module 402. Corresponding to a received power reference signal from the current attachment point, information is obtained, e.g., a power measurement and/or a SINR value.

Power reference signals, indicators of resource fraction signals, and signals indicating a number of best effort users are received from a plurality of attachment points, e.g., base station attachment points in the local vicinity of the access terminal from which such broadcast signals can be recovered. In some embodiments, the access terminal 400 receives power reference signals, e.g., OFDM beacon signals, from a plurality of attachment point including its currently connection and possible alternative connections, and the access terminal receives broadcast signals from its current attachment point conveying fractional resources indicators and number of best effort users information corresponding to the current attachment point and to other possible alternative attachment points in the local vicinity.

A received mode command signal, e.g., signal 454 is received from an attachment point with which the access terminal 400 has a connection, the signal indicating an access terminal mode of operation, e.g., one of a QoS data traffic mode of operation and a best effort data traffic mode of operation.

Wireless transmitter module 404, e.g., an OFDM transmitter, is coupled to transmit antenna 416 via which the access terminal transmits signals, e.g., uplink signals to attachment points of base stations. Uplink signals include, e.g., a signal indicating a desired mode of access terminal operation, handoff signals and uplink traffic channel signals. Generated signal indicating a desired mode of operation 452 is transmitted by wireless transmitter module 404 to an attachment point with which the access terminal currently has a connection, the desired mode of operation being one of a best effort mode of operation and a QoS mode of operation.

Routines 418 include a communications routine 422 and access terminal control routines 424. The communications routine 422 implements the various communications protocols used by the access terminal 400. Access terminal control routines 424 include a handoff decision module 426, a mode determination module 434 and an access terminal mode request module 436. Handoff decision module 426 includes an attachment point preliminary screening module 428, and attachment point selection module 430 and a best effort selection module 432.

Data/information 420 includes a plurality of received indicators of resource fractions corresponding to different attachment points (received indicator of resource fraction for attachment point 1 438, . . . , received indicator of resource fraction for attachment point N 440), information corresponding to a plurality of received power reference signals (received power reference signal for attachment point 1 456, . . . , received power reference signal for attachment point N 458), and received information communicating the number of best effort users being serviced by an attachment point (received number of best effort users being serviced by attachment point 1 460, . . . , received number of best effort users being serviced by attachment point N 462). Data/information 420 also includes handoff decision information 442, an identified set of attachment points satisfying QoS requirements 444, information identifying a selected attachment point for use in QoS mode 446, information identifying a selected attachment point for use in best effort mode 448, a determined mode of access terminal operation 450, a generated signal indicating a desired mode of access terminal operation 452, a received signal indicating a commanded mode of access terminal operation 454, information identifying best effort capacity associated with different attachment points (best effort capacity for attachment point 1 464, . . . , best effort capacity for attachment point N 466), and QoS requirement information 468. The QoS requirement information 468 includes data rate information 470 and delay information 472.

Handoff decision module 426 makes a handoff decision based on received indicators corresponding to different attachment points. The received indicators are received via the wireless receiver module 402, e.g., a received indicator is conveyed in a broadcast signal from an attachment point. Received indicators of resource fractions indicating for an individual attachment point a fraction of communications resources available at the attachment point not utilized for QoS service (received indicator of resource fraction for attachment point 1 438, received indicator of resource fraction for attachment point N 440) are used as inputs to the handoff decision module 426. The communications resources are, e.g., time, frequency, and/or space. In some embodiments the communications resources are communications resources for communicating traffic data. Handoff decision 442, e.g., information including the result of the decision: (i) to remain using the current connection with the current attachment point or (ii) to change to a different attachment point, and for cases of a handoff, information identifying the new selected attachment point to be used, is an output of handoff decision module 426.

Handoff decision module 426 includes an attachment point preliminary screening module 428, and attachment point selection module 430 and a best effort selection module 432. The attachment point preliminary screening module 428 identifies a set of attachment points which can provide a connection satisfying the QoS requirements of the access terminal while operating the access terminal in a QoS mode of operation. QoS requirement information 468 is used as an input by the attachment point preliminary screening module 428. Data rate information 470 includes a minimum data rate requirement for the access terminal. Delay information 472 is a maximum queuing delay indicating a maximum time data can be stored in a queue prior to transmission. Identified set of attachment points satisfying QoS requirement 444 is an output of screening module 428 and an input to selection module 430. The attachment point preliminary screening module 428 bases its identification of whether a potential attachment point under consideration should be included in the set of attachment points satisfying QoS requirements for the access terminal, on the received indicated fraction of communications resources available at the attachment point not utilized for QoS service, e.g., module 428 uses information 438 for attachment point 1 and uses information 440 for attachment point N. In some embodiments, the attachment point preliminary screening module 428 bases its identification of whether a potential attachment point under consideration should be included in the set of attachment points satisfying QoS requirements for the access terminal, on a power reference signal received from the individual attachment point which is under consideration for inclusion in the set, e.g., screening module 428 uses information 456 corresponding to attachment point 1 or uses information 458 corresponding to attachment point N.

Attachment point selection module 430 selects a connection with an attachment point from the set of identified attachment points 444 for use while in the QoS mode of operation. Selected attachment point for use in QoS mode 446 is an output of attachment point selection module 430.

In some embodiments, the attachment point selection module 430 selects the connection having the greatest capacity for communicating best effort traffic between the access terminal and the attachment point. For example, the attachment point selection module 430 considers the best effort capacity estimates, determination, or communicated information corresponding to the attachment points on the identified set of attachment points satisfying the access terminal's QoS requirements 444, and selects the attachment point with the greatest best effort capacity. One or more of best effort capacity information (464, . . . , 466) is used as an input to attachment point selection module 430.

In some embodiments, the attachment point selection module 430 selects a connection with an attachment point from the identified set 444 as a function of the number of best effort users being serviced by individual attachment points under consideration. For example, the wireless receiver module 402 receives information indicating the number of best effort users being serviced, e.g., at the present time, by individual attachment points (received number of best effort users being serviced by attachment point 1 460, . . . , number of best effort users being serviced by attachment point N 462), and then selection module 430 uses the information corresponding to attachments points on its list 444, in its selection function when making the selection.

In one exemplary embodiment, the attachment point preliminary screening module 428 checks if an attachment point satisfies the access terminal's QoS requirements by checking: is BW(F) log (1+SINR)>$R_Q$ ?, where BW is the communications resource bandwidth of the attachment point under consideration, F is the fraction of the communications resource available at the attachment point not utilized for QoS service, where SINR is an access terminal determined signal to interference plus noise ratio corresponding to the attachment point, and where $R_Q$ is a minimum quality of service data rate requirement for the access terminal. In one exemplary embodiment, the attachment point selection module 430 selects a connection with an attachment point from the set of identified attachment points, wherein said selecting includes selecting the attachment point having the largest capacity after satisfying QoS requirements. For example, the access terminal 400 chooses to use the attachment point with the largest (BW)(F)log(1+SINR) determined value among those alternative attachment points which satisfied the requirement tested by the attachment point preliminary screening module 428.

Best effort selection module 432 selects a connection corresponding to an attachment point having the greatest potential best effort capacity for operation when the mode determination module 434 determines that the access terminal is in best effort mode. Best effort capacity information (464, 466) are inputs to best effort selection module 432.

Mode determination module 434 determines, prior to making a handoff decision, if the access terminal is in a best effort mode of access terminal operation or a QoS mode of access terminal operation. Determined current mode of access terminal operation 450 is an output of mode determination module 434 and is used as an input to handoff decision module 426, where modules 428 and 430 are executed if the determined mode is QoS or module 432 is executed if the determined mode is best effort. Access terminal mode request module 436 generates a signal indicating a desired mode of access terminal operation, e.g., where the access terminal 400 desires to change modes between Quality of Service traffic mode and best effort traffic mode.

Figure 5:
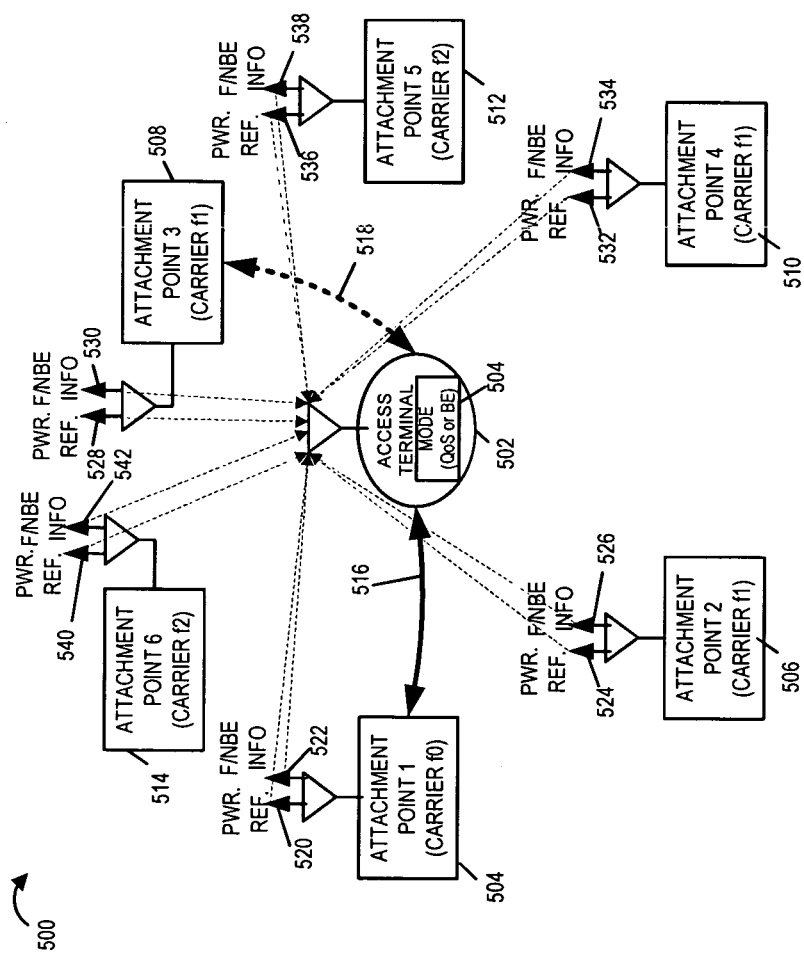
FIG. 5 and FIG. 6 are used to illustrate an example of a handoff method.
Figure 6:
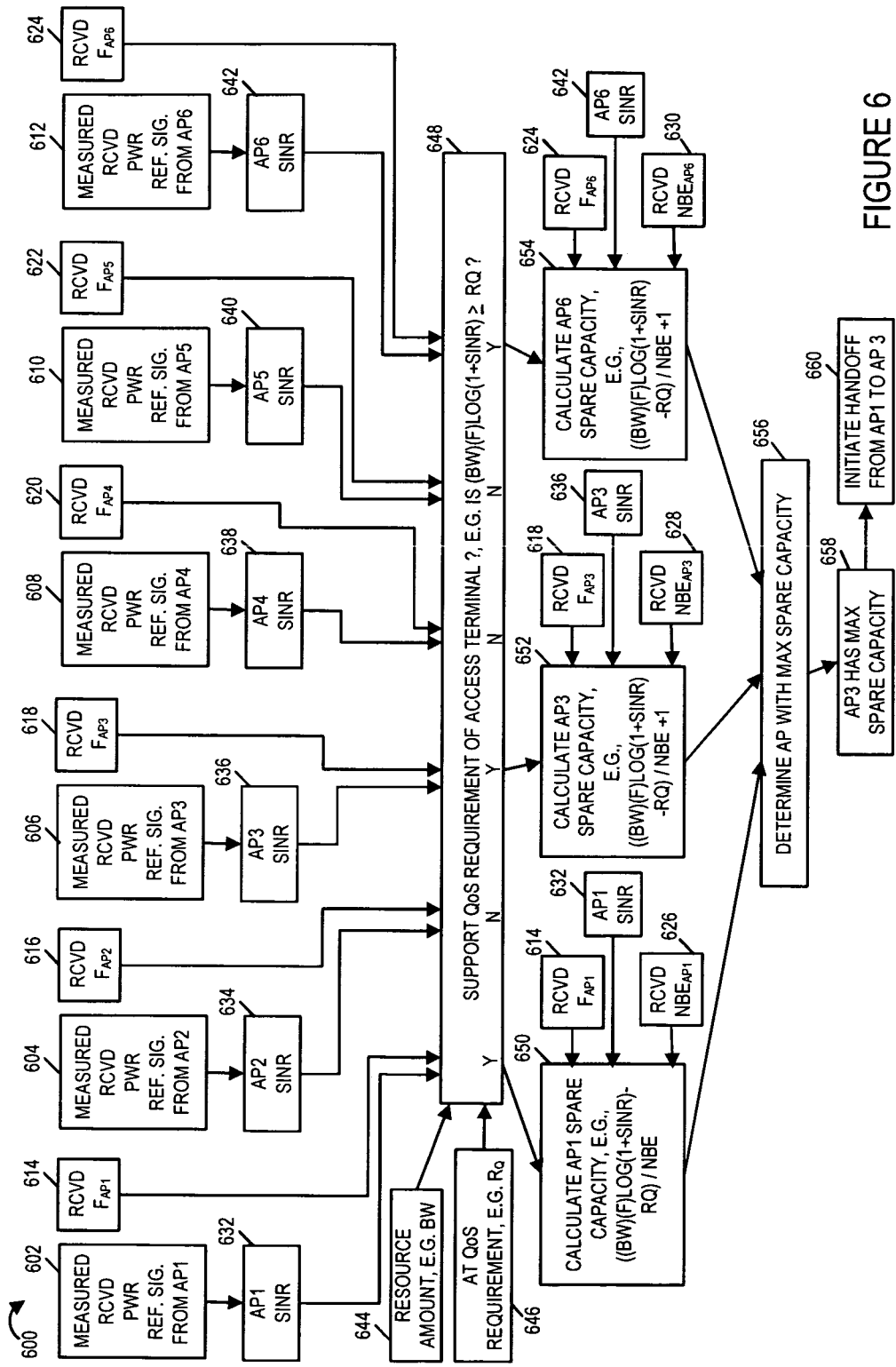

Drawing 500 of FIG. 5 and drawing 600 of FIG. 6 are used to illustrate an example of a handoff decision based on indicators of resource fractions. Access terminal 502 is, e.g., access terminal 400 of FIG. 4 or any of the access terminals in system 100 of FIG. 1. The attachment points (502, 504, 506, 508, 510, 512, 514) in FIG. 5 are, e.g., attachment points included in base stations such as those shown in FIG. 1. In FIG. 5 access terminal 502 is currently connected to attachment point 1 504 as illustrated by solid line arrow 516. Access terminal 502 receives power reference level signals, e.g., OFDM beacon signals, from a plurality of attachment points in the vicinity. More specifically access terminal 502 receives power reference level signals (520, 524, 528, 532, 536, 540) from attachment points (504, 506, 508, 510, 512, 514), respectively. The access terminal 502 also receives fractional resource information (F) indicating a fraction of resources not used by QoS users and information communicating a number of best effort users (NBE) conveyed in signals (522, 526, 530, 534, 538, 542) from attachment points (504, 506, 508, 510, 512, 514), respectively. In some embodiments, an attachment point may, and sometimes does, transmit fractional resource usage information and/or number of best effort users information about other attachment points in addition to its own attachment points, e.g., with such information having been exchanged between attachment points via a backhaul network. In such an embodiment, access terminal 502 could receive the fractional resource usage information and/or number of best effort users pertaining to a plurality of attachment points, e.g., the current attachment point and other attachment points in the local vicinity, via the current connection.

Access terminal 502 has a current mode of traffic operation 504, which is one of a QoS mode and a best effort mode. The access terminal performs handoff decisions differently as a function of the mode of traffic operation. Access terminal 502 processes at least some of the received signals and makes a handoff decision. In this example, access terminal 502 decides to handoff to attachment point 3 508 as indicated by dotted line arrow 518.

Consider that the access terminal 502 is in QoS mode, and that the QoS criteria being considered is a minimum data rate requirement for the access terminal, $R_Q$. The handoff decision process includes a first part in which the access terminal tests potential connections to attachment points to determine which of the attachment points will support the $R_Q$, and the access terminal forms a set of attachment points which meet the minimum data rate requirement. In one example, the formula used for screening to see if an attachment point should be included in the set is: Is (BW)(F)(1+SINR)≧$R_Q$ ?, where BW is the bandwidth being used at the attachment point which represent the resources used for both QoS and best effort traffic users, where F is a fraction of the resources not used by QoS users which is communicated to the access terminal, where SINR is a signal to information plus noise ratio calculated by the access terminal corresponding to the attachment point based on a received power reference signal from the attachment point, and where RQ is a minimum data rate requirement of the access terminal.

In a second part of the handoff decision process, the access terminal determines spare capacity for each of the potential connections of the set, and selects to connect to the attachment point with the highest spare capacity among the set. If the connection with the highest pare capacity is different than the current connection, then a handoff is initiated. In one embodiment, if the attachment point being evaluated for spare capacity corresponds to an other connection, i.e. not the attachment point of the current connection, the following formula is used: ((BW)(F)log(1+SINR)−RQ)/($N_{BE}$+1); if the attachment point being evaluated for spare capacity corresponds to its own current connection, the following formula is used: ((BW)(F)log(1+SINR)−RQ)/($N_{BE}$). Note that $N_{BE}$ represents the number of best effort users at an attachment point, which is communicated to the access terminal, e.g., in a broadcast message.

Drawing 600 of FIG. 6 illustrates various operations, aspects and features of an example in which the access terminal, e.g., access terminal 502, is in QoS mode and makes a handoff decision as a function of received fractional resource information. Power reference signals, e.g., OFDM beacon signals, are received corresponding to a plurality of attachment points in the vicinity, and the received power is measured (measured received power of power reference signal from attachment point 1 602, measured received power of power reference signal from attachment point 2 604, measured received power of power reference signal from attachment point 3 606, measured received power of power reference signal from attachment point 4 608, measured received power of power reference signal from attachment point 5 610, measured received power of power reference signal from attachment point 6 612). Signal to interference plus noise ratios are determined corresponding to each of the received power reference signals (AP 1 SINR 632, AP 2 SINR 634, AP 3 SINR 636, AP 4 SINR 638, AP 5 SINR 640, AP 6 SINR 642). Information communicating the fraction of resources not used by QoS users at each attachment point (received $F_{AP1}$ 614, received $F_{AP2}$ 616, received $F_{AP3}$ 618, received $F_{AP4}$ 620, received $F_{AP5}$ 622, received $F_{AP6}$ 624), has also been communicated to the access terminal, e.g., via downlink broadcast messages, which may be received from the current attachment point or from the current attachment point and other attachment points.

For each of the received power reference signals, the access terminal performs a screening test to see if the attachment point can support the current QoS requirement of the access terminal, as indicated in box 648. An exemplary screening test evaluation is: Is $(BW)(F)Log(1+SINR) \geq R_Q$ ? Inputs to the screening test include a resource amount 644, e.g., resource bandwidth, and an access terminal Quality of Service requirement, e.g., $R_Q$ where $R_Q$ is a minimum data rate requirement. Corresponding to each attachment point being checked (AP1, AP2, AP3, AP4, AP5, AP6), there is also a input derived from the power reference signal and a received indicator of resource fraction input ((AP1 SINR 632, received $F_{AP1}$ 614), (AP2 SINR 634, received $F_{AP2}$ 616), (AP3 SINR 636, received $F_{AP3}$ 618), (AP4 SINR 638, received $F_{AP4}$ 620), (AP5 SINR 640, received $F_{AP1}$ 622), (AP6 SINR 642, received $F_{AP6}$ 624)), respectively. In this example, operations of module 648 determine that attachment points (AP1, AP3, and AP6) support the AT's QoS requirement but attachment points (AP2, AP4, and AP5) do not.

For the attachment points deemed to satisfy the AT's QoS requirement, the access terminal calculates spare capacity. In this example, the access terminal uses a different function to calculate spare capacity for a current attachment point, than for a possible alternative attachment point. Box 650 indicates that the access terminal calculates the spare capacity corresponding to attachment point 1, which is the current attachment point, using, e.g., the formula: $((BW)(F)Log(1+SINR)-R_Q)/NBE$, where the input for F is received $F_{AP1}$ 614, the SINR is AP1 SINR 632 and the number of best effort users is received number of best effort users for attachment point 1 $NBE_{AP1}$ 626. Box 652 indicates that the access terminal calculates the spare capacity corresponding to attachment point 3 using, e.g., the formula: $((BW)(F)Log(1+SINR)-R_Q)/(NBE+1)$, where the input for F is received $F_{AP3}$ 618, the SINR is AP3 SINR 636 and the number of best effort users is received number of best effort users for attachment point 3 $NBE_{AP3}$ 628. Box 654 indicates that the access terminal calculates the spare capacity corresponding to attachment point 6 using, e.g., the formula: $((BW)(F)Log(1+SINR)-R_Q)/(NBE+1)$, where the input for F is received $F_{AP6}$ 624, the SINR is AP6 SINR 642 and the number of best effort users is received number of best effort users for attachment point 6 $NBE_{AP6}$ 630.

The outputs from the reserve capacity calculations of boxes (650, 652 and 654) are input to module 656 which determines the AP with the maximum spare capacity from among the set. For this example, consider that module 656 determines that AP 3 has the maximum spare capacity as indicated in block 658. In response to this determination, the access terminal initiates a handoff from attachment point 1 to attachment point 3 as indicated in block 660.

Figure 7:
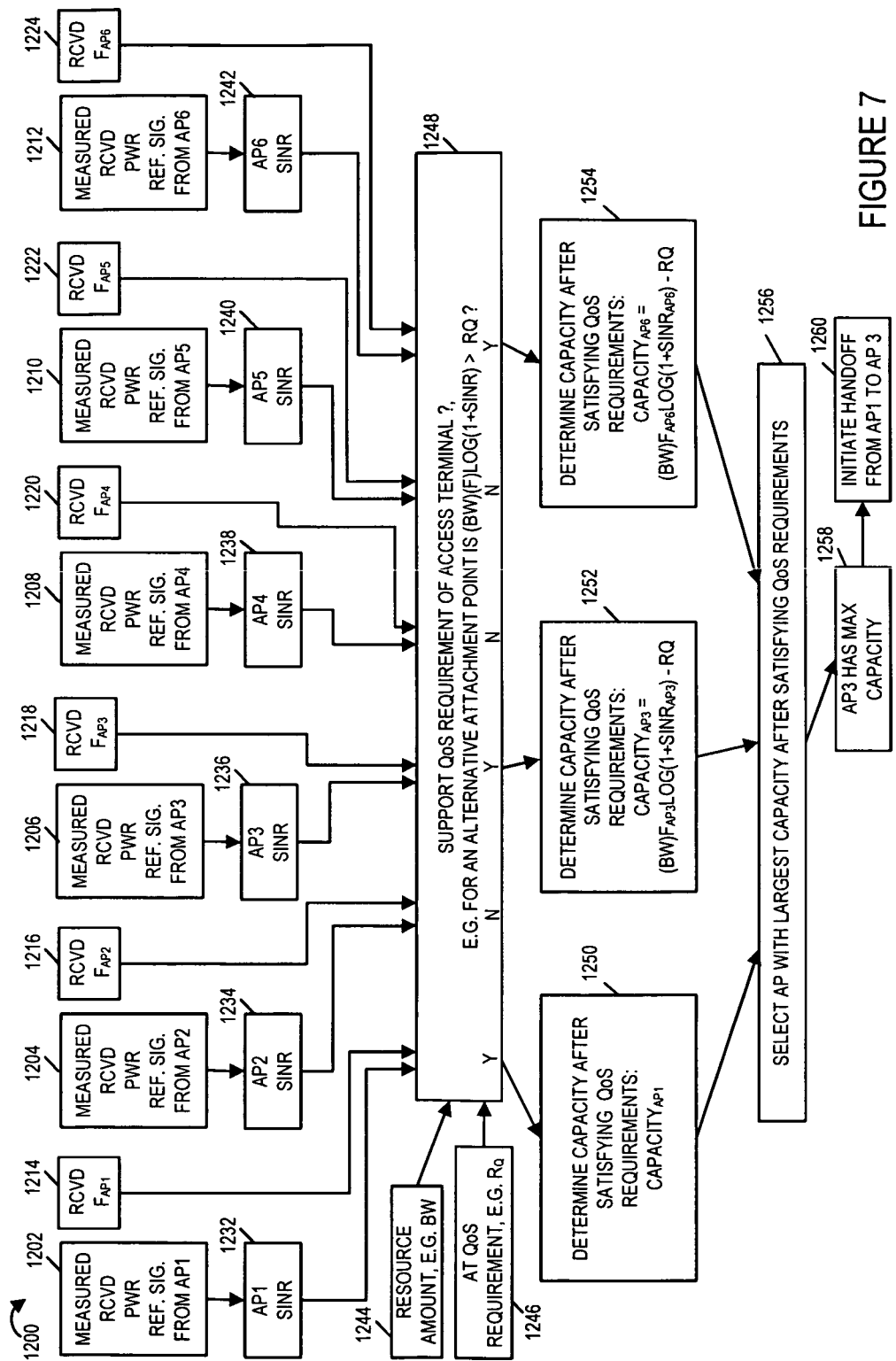
FIG. 7 is used to illustrate another example of a handoff method.

In some embodiments, the air link resource for uplink and downlink is handled jointly, e.g., with a single communicated F and single NBE being for an attachment point. In some other embodiments, uplink and downlink are handled separately, e.g., with a separate $F_{UL}$, $F_{DL}$ and separate $NBE_{UL}$, $NBE_{DL}$ being communicated for an attachment point. In some embodiments, the base station schedulers are such that fractional resource based handoff decisions are implemented on one of the uplink and downlink, but not both of the uplink and downlink. Drawing 1200 of FIG. 7 illustrates various operations, aspects and features of an example in which the access terminal, e.g., access terminal 502, is in QoS mode and makes a handoff decision as a function of received fractional resource information. Power reference signals, e.g., OFDM beacon signals, are received corresponding to a plurality of attachment points in the vicinity, and the received power is measured (measured received power of power reference signal from attachment point 1 1202, measured received power of power reference signal from attachment point 2 1204, measured received power of power reference signal from attachment point 3 1206, measured received power of power reference signal from attachment point 4 1208, measured received power of power reference signal from attachment point 5 1210, measured received power of power reference signal from attachment point 6 1212). Signal to interference plus noise ratios are determined corresponding to each of the received power reference signals (AP 1 SINR 1232, AP 2 SINR 1234, AP 3 SINR 1236, AP 4 SINR 1238, AP 5 SINR 1240, AP 6 SINR 1242). Information communicating the fraction of resources not used by QoS users at each attachment point (received $F_{AP1}$ 1214, received $F_{AP2}$ 1216, received $F_{AP3}$ 1218, received $F_{AP4}$ 1220, received $F_{AP5}$ 1222, received $F_{AP6}$ 1224), has also been communicated to the access terminal, e.g., via downlink broadcast messages, which may be received from the current attachment point or from the current attachment point and other attachment points.

For each of the received power reference signals, the access terminal performs a screening test to see if the attachment point can support the current QoS requirement of the access terminal, as indicated in box 1248. An exemplary screening test evaluation, for an alternative attachment point is: Is $(BW)(F)Log(1+SINR) > R_Q$ ? Inputs to the screening test include a resource amount 1244, e.g., resource bandwidth, and an access terminal Quality of Service requirement 1246, e.g., $R_Q$ where $R_Q$ is a minimum data rate requirement for the access terminal. A different screening test may be, and sometimes is, used for an attachment point of a current connection. Corresponding to each attachment point being checked (AP1, AP2, AP3, AP4, AP5, AP6), there is also a input derived from the power reference signal and a received indicator of resource fraction input ((AP1 SINR 1232, received $F_{AP1}$ 1214), (AP2 SINR 1234, received $F_{AP2}$ 1216), (AP3 SINR 1236, received $F_{AP3}$ 1218), (AP4 SINR 1238, received $F_{AP4}$ 1220), (AP5 SINR 1240, received $F_{AP1}$ 1222), (AP6 SINR 1242, received $F_{AP6}$ 1224)), respectively. In this example, operations of module 1248 determine that attachment points (AP1, AP3, and AP6) support the AT's QoS requirement, but attachment points (AP2, AP4, and AP5) do not.

For the attachment points deemed to satisfy the AT's QoS requirement, the access terminal determines capacity after satisfying QoS requirements. In this example, the access terminal uses a different function to calculate capacity for a current attachment point, than for a possible alternative attachment point. Box 1250 indicates that the access terminal calculates the capacity after satisfying QoS requirements corresponding to attachment point 1, which is the current attachment point, obtaining the output value $Capacity_{AP1}$. Box 1252 indicates that the access terminal calculates the capacity after satisfying QoS requirements corresponding to attachment point 3 using, e.g., the formula: $((BW)(F)Log(1+SINR)-R_Q)$, where the input for F is received $F_{AP3}$ 1218, and the SINR is AP3 SINR 1236, obtaining output value Capacity$_{AP3}$. Box 1254 indicates that the access terminal calculates the capacity after satisfying QoS requirements corresponding to attachment point 6 using, e.g., the formula: ((BW)(F)Log (1+SINR)−R$_Q$), where the input for F is received F$_{AP6}$ 1224, and the SINR is AP6 SINR 1242, obtaining output value Capacity$_{AP6}$.

The outputs from the capacity calculations of boxes (1250, 1252 and 1254) are input to module 1256 which determines the AP with the largest capacity after satisfying QoS requirements from among the set. For example, module 1256 selects the AP corresponding to the maximum of (Capacity$_{AP1}$, Capacity$_{AP2}$, Capacity$_{AP3}$). For this example, consider that module 1256 determines that AP3 has the maximum capacity as indicated in block 1258. In response to this determination, the access terminal initiates a handoff from attachment point 1 to attachment point 3 as indicated in block 1260.

In another embodiment, the access terminal finds which one of the potential alternative attachment points which supports the QoS requirements of the access terminal has the most reserve capacity. For example, consider that AP3 and AP6 are the potential alternative attachment points which meet the AT's QoS requirements, then the access terminal determine the attachment point with most reserve capacity by finding the attachment point corresponding to the maximum ((BW)(F$_{AP3}$) Log(1+SINR$_{AP3}$), (BW)(F$_{AP6}$)Log(1+SINR$_{AP6}$)). The access point also determines whether or not the current attachment point still is satisfies the access terminal's requirements and the amount of reserve capacity corresponding to the current attachment point. Then the access terminal makes a handoff decision as a function of the reserve capacity of the current attachment point and the best alternative attachment point.

In some embodiments, the air link resource for uplink and downlink is handled jointly, e.g., with a single communicated F and single NBE being for an attachment point. In some other embodiments, uplink and downlink are handled separately, e.g., with a separate F$_{UL}$, F$_{DL}$ and separate NBE$_{UL}$, NBE$_{DL}$ being communicated for an attachment point. In some embodiments, the base station schedulers are such that fractional resource based handoff decisions are implemented on one of the uplink and downlink, but not both of the uplink and downlink.

Figure 8:
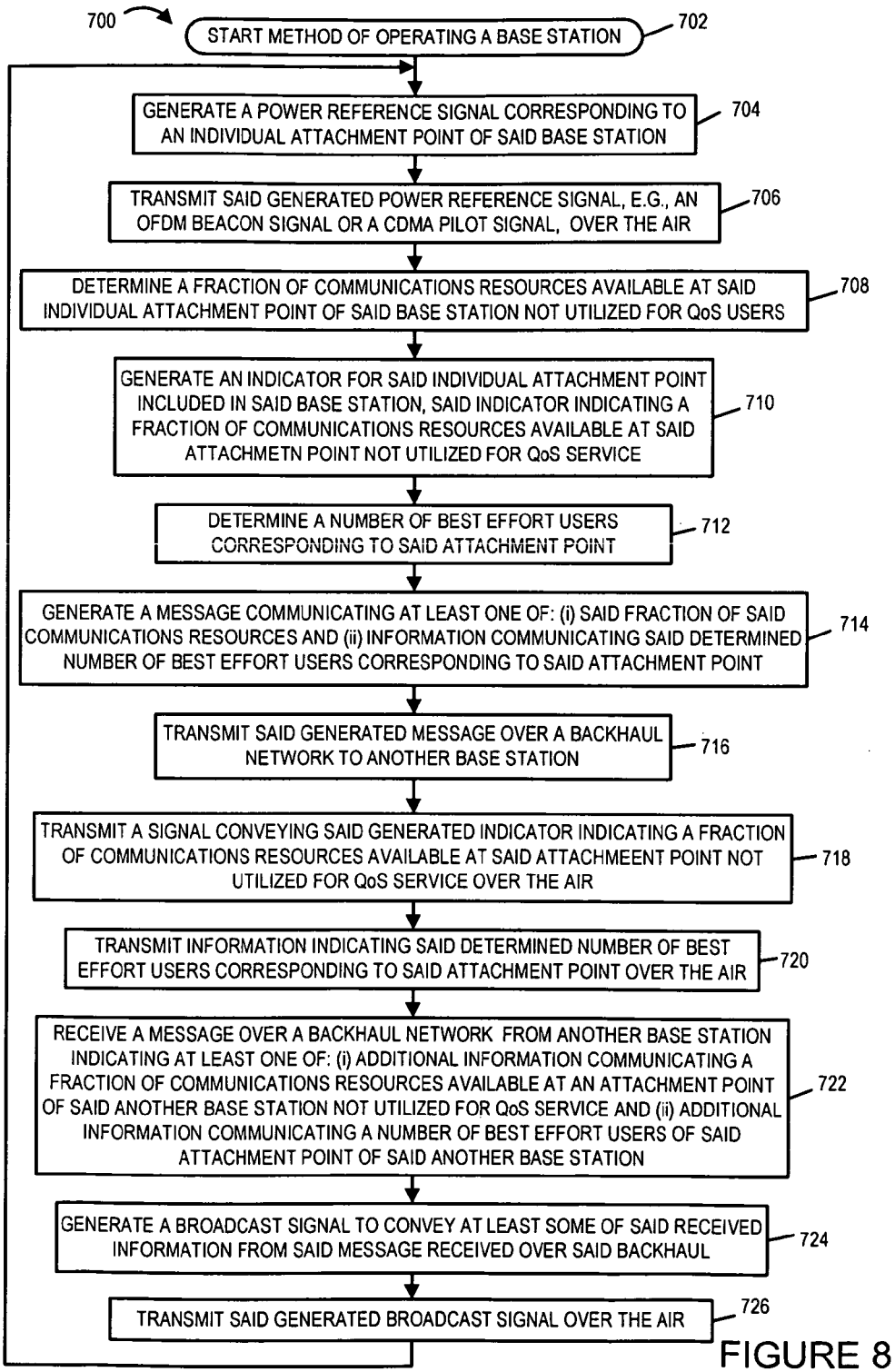
FIG. 8 is a flowchart of an exemplary method of operating a base station in accordance with an exemplary embodiment.

FIG. 8 is a flowchart 700 of an exemplary method of operating a base station in accordance with an exemplary embodiment. Operation of the exemplary method starts in step 702, where the base station is powered on and initialized and proceeds to step 704. In step 704, the base station generates a power reference signal corresponding to an individual attachment point of said base station and in step 706, the base station transmits the generated power reference signal over the air. In some embodiments, the generated power reference signal is one of an OFDM beacon signal and a CDMA pilot signal. Operation proceeds from step 706 to step 708.

In step 708, the base determines a fraction of communications resources available at said individual attachment points of said base station not utilized for QoS users. Then, in step 710, the base station generates an indicator for said individual attachment point included in said base station, said indicator indicating a fraction of communications resources available at said attachment point not utilized for QoS service. In some embodiments the communications resources are communications resources for communicating traffic data, e.g., traffic channel segments. The communications resources include, e.g., time, frequency, and/or space. Operation proceeds from step 710 to step 712. In step 712, the base station determines a number of best effort users corresponding to said attachment point. Operation proceeds from step 712 to step 714.

In step 714, the base station generates a message communicating at least one of: (i) said fraction of said communications resources and (ii) information communicating said determined number of best effort users corresponding to said attachment point. Then, in step 716, the base station transmits said generated message over a backhaul network to another base station. Operation proceeds from step 716 to step 718.

In step 718 the base station transmits a signal conveying said generated indicator indicating a fraction of communications resources available at said attachment point not utilized for QoS service over the air. In some embodiments, the signal conveying said generated indicator is a broadcast signal. Operation proceeds from step 718 to step 720 in which the base station transmits information indicating said determined number of best effort users corresponding to said attachment point over the air. Operation proceeds from step 720 to step 722.

In step 722, the base station receives a message over a backhaul network from another base station indicating at least one of: (i) additional information communicating a fraction of communications resources available at an attachment point of said another base station not utilized for QoS service and (ii) additional information communicating a number of best effort users of said attachment point of said another base station. Operation proceeds from step 722 to step 724, in which the base station generates a broadcast signal to convey at least some of said received information from said message received over said backhaul. Then, in step 726 the base station transmits said generated broadcast signal over the air. Operation proceeds from step 726 to step 704, where the base station generates another power reference signal.

In some embodiments, the base station includes a plurality of attachment points, and the step of determining the fraction communications resources available at an attachment point not utilized for QoS users is performed for each of said plurality of attachment points. In some embodiments, corresponding to an attachment point of said base station the indicator for said attachment point indicating a fraction of communications resources not utilized for QoS service and the determined number of best effort users corresponding to the attachment point is encoded and communicated in the same broadcast signal transmitted over the air from the base station. In some embodiments indicators of resource fractions and number of best effort users pertain to both uplink and downlink. In other embodiments, indicators of resource fractions and number of best effort users correspond to one of an uplink and a downlink. In some embodiments, corresponding to an individual attachment point of the base station at a given time there is a first pair of a fraction resource indicator and number of best effort users corresponding to the downlink and a second pair of a fraction resource indicator and number of best effort users corresponding to the uplink.

Figure 9:
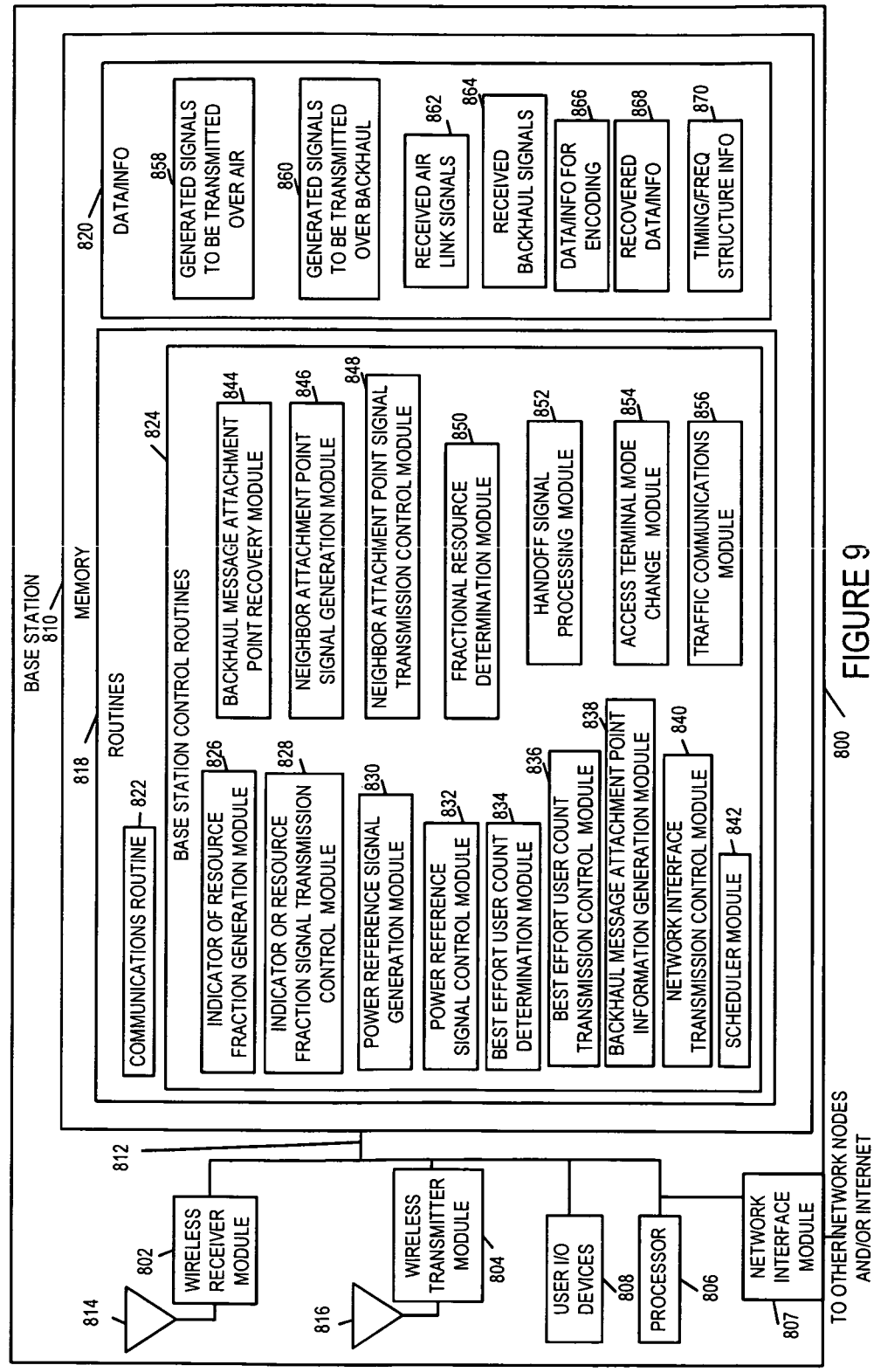
FIG. 9 is a drawing of an exemplary base station in accordance with an exemplary embodiment.
Figure 10:
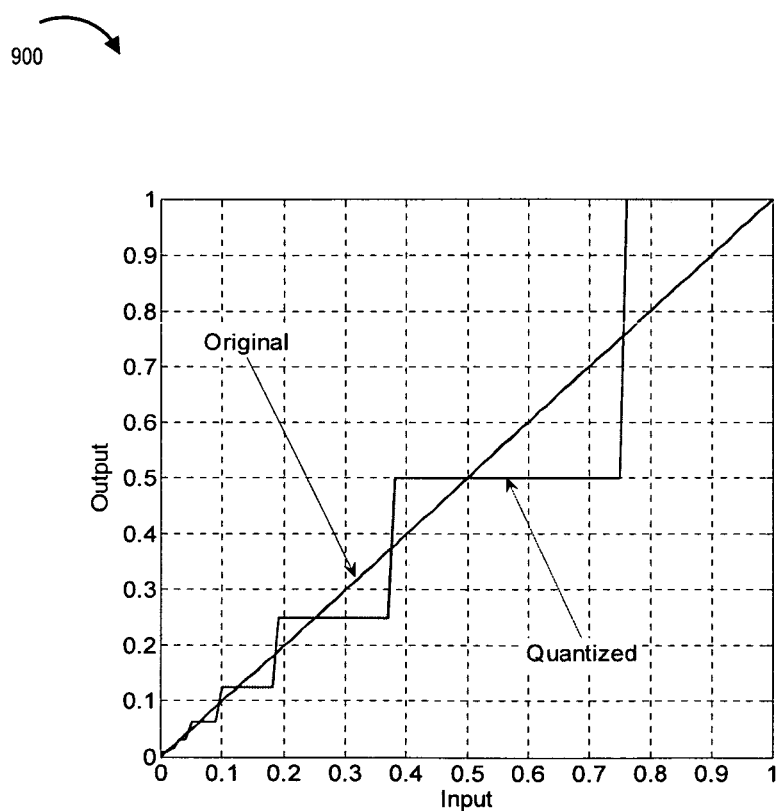
FIG. 10 illustrates the input-output relationship of an exemplary quantizer used for load information.

FIG. 9 is a drawing of an exemplary base station 800 in accordance with an exemplary embodiment. Base station 800 includes one or more base station attachment points, e.g., each base station attachment point of the base station corresponding to a different combination of sector and carrier.

Exemplary base station 800 includes a wireless receiver module 802, a wireless transmitter module 804, user I/O devices 808, a processor 806, a network interface module 807 and a memory 810 coupled together via a bus 812 over which the various elements can interchange data and information. Memory 810 includes routines 818 and data/information 820. The processor 806, e.g., a CPU, executes the routines and uses the data/information 820 in memory 810 to control the operation of the base station 800 and implement methods, e.g., the method of flowchart 700 of FIG. 8.

Wireless receiver module 802, e.g., an OFDM receiver, is coupled to receive antenna 814 via which the base station receives uplink signals from access terminals. Received uplink signal include, e.g., mode change request signals, handoff signals, and uplink traffic channel signals.

Wireless transmitter module 804, e.g., an OFDM transmitter, is coupled to transmit antenna 816 via which the base station 800 transmits downlink signal to access terminal. Downlink signals include, e.g., power reference signals such as OFDM beacon signals, a broadcast signal including an indicator of resource fraction corresponding to an attachment point of base station 800, a broadcast signal including a indicator of resource fraction corresponding to another base station, a broadcast signal including information communicating a number of best effort users at an attachment point of base station 800, a broadcast signal indicating a number of best effort users at an attachment point of another base station, a handoff signal, an access terminal mode change command signal, a downlink assignment signal, and a downlink traffic channel segment signal.

User I/O devices 808 include, e.g., a keyboard and a display. User I/O devices are used, e.g., by a service provider representative to control the base station, configure the base station and/or upgrade the base station.

Network interface module 807 couples the base station 800 to other network nodes, e.g. other base stations, AAA nodes, home agent nodes, etc., and/or the Internet via a backhaul network. Generated backhaul messages communicated fraction resource information and/or number of best effort users regarding base station 800 attachment points are communicated to other base stations via network interface 807. Backhaul messages from other base station communicating fractional resource information and/or number of best effort users regarding attachment points of other base stations are received via network interface module 807.

Routines 818 include a communications routine 822 and base station control routines 824. Communications routine 822 implements the various communications protocols used by the base station 800. Base station 800 includes a fraction resource indicator generation module 826, a fractional resource transmission control module 828, a power reference signal generation module 830, a power reference signal control module 832, a best effort user count determination module 834, a best effort user count transmission control module 836, a backhaul message attachment point information generation module 838, a network interface transmission control module 840, a scheduler module 842, a backhaul message attachment point recovery module 844, a neighbor attachment point signal generation module 846, a neighbor attachment point signal transmission control module 848, a fractional resource determination module 850, a handoff signal processing module 852, an access terminal mode change module 854, and a traffic communications module 856.

Data/information 820 includes generated signals to be transmitted over the air link 858, generated signals to be transmitted over backhaul 860, received air link signal 862, received backhaul signals 864, data/info for encoding 866, recovered data/information 868 and timing/frequency structure information 870.

Fractional resource determination module 850 determines attachment points of base station 800, on a per attachment point basis, a fraction of communications resources available at an individual attachment point not utilized for QoS users. The communications resources are, e.g., time, frequency and/or space. In some embodiments the communications resources are for communication of traffic data, e.g., traffic segments. Indicator of resource fraction generation module 826 generates an indicator for an individual attachment point included in base station 800, said indicator indicating a fraction of communications resources available at said attachment point not utilized for QoS service. Fraction resource signal transmission control module 828 controls the wireless transmitter module 802 to transmit a signal conveying a generated indicator from module 826 over the air.

Power reference signal generation module 830 generates a power reference signal, e.g., an OFDM beacon signal, an OFDM pilot signal, or a CDMA pilot signal, corresponding to an attachment point of base station 800. Power reference signal control module 832 controls the wireless transmitter module 802 to transmit a generated power reference signal from module 830 over the air. Best effort user count determination module 834 determines a number of best effort users corresponding to an attachment point of base station 800. Best effort user count transmission control module 836 controls the wireless transmitter module 804 to transmit information indicating a determined number of best effort users corresponding to an attachment point of base station 800.

Backhaul message attachment point information generation module 838 generates a message communicating at least one of: (i) a fraction of communications resources available at an attachment point of base station 800 not utilized for QoS service and (ii) information communicating a determined number of best effort users corresponding to an attachment point of base station 800. Network interface transmission control module 840 controls the network interface module 807 to transmit a message generated by module 838 over a backhaul network to another base station, e.g., an adjacent base station.

Backhaul message attachment point recovery module 844 processes a message received over a backhaul network via network interface module 807 from another base station to recover information indicating at least one of: (i) additional information communication a fraction of communications resources available at an attachment point of another base station not utilized for QoS service and (ii) additional information communicating a number of best effort users of an attachment point of another base station. Neighbor attachment point signal generation module 846 generates a broadcast signal to convey at least some of the received information recovered by recovery module 844 which was received from the message communicated over the backhaul. Neighbor attachment point signal transmission control module 848 controls the wireless transmitter module 804 to transmit a generated broadcast signal from module 846 over the air.

Handoff signal processing module 852 processes a received handoff signal, said received handoff signal having been generated by an access terminal in response to a handoff decision based on a fraction resource indicator transmitted by base station 800 and received by the access terminal.

At least some of the access terminal in the communications system including base station 800 support a QoS traffic mode of operation and a Best Effort traffic mode of operation. Access terminal mode change module 802 processes received mode change request signals received via wireless receiver module 802, makes mode decisions, and generates mode command signals which are transmitted to access terminals via wireless transmitter module 804.

Traffic communications module 856 handles uplink and downlink traffic signaling, e.g., encoding user data into downlink traffic segment signals and recovering user data from received uplink traffic segment signals. Scheduler module 842, e.g., a scheduler, schedules access terminals to air link resource including traffic channel segments. Scheduler module 842 differentiates between access terminal which are in best effort mode and access terminals which are in QoS mode when making scheduling decisions.

Generated signals to be transmitted over the air include a power reference signals corresponding to an attachment point of base station 800, a broadcast signals communicating fractional resource information corresponding to an attachment point of base station 800, a broadcast signal communicating fraction resource information corresponding to an attachment point of another base station, a broadcast signal communicating a number of best effort users corresponding to an attachment point of base station 800, a broadcast signal communicating a number of best effort users corresponding to attachment point of another base station, a traffic channel assignment signal for an access terminal, a mode change command signal to an access terminal, and a downlink traffic segment signal. Generated signal to be transmitted over the backhaul include a signal communicating fraction resource information and/or number of best effort users corresponding to one or more attachment points of base station 800. Received backhaul signals 864 include a signal communicating resource information and/or number of best effort users corresponding to one or more attachment points of another base station, e.g., a base station which is adjacent to base station 800. Received air link signals 862 include access terminal mode change request signals, access terminal handoff signals, and uplink traffic channel segment signals.

Data/information for encoding includes information used to generate a particular power reference signal, e.g., beacon signal associated with a particular base station attachment point, e.g., tone and/or power level information, fraction resource information, numbers of best effort users, and user traffic data. Recovered data/information 868 includes fraction resource information, numbers of best effort users, and user traffic data. Timing/frequency structure information 870 includes information identifying a recurring timing/frequency structure includes resources dedicated for power reference signal, resources dedicated for broadcast signals conveying fractional resource information and/or number of best effort users information, and resources for traffic segments.

Various aspects, features, embodiments, nodes and/or systems will now be described. One or more of aspects and/or features described below may be used in the system 100 of FIG. 1, the method of flowchart 200, the method of flowchart 300, the method of flowchart 700 of FIG. 8, the access terminal 400 of FIG. 4, and/or the base station of FIG. 9. An access terminal is sometimes alternatively referred to as a wireless terminal.

Consider the case of a multi-carrier network in which a terminal supports use of a single-carrier at a time. In one such a system, the handoff methodology on the terminal has to decide on the appropriate sector and carrier to establish a connection. Various aspects are directed to a mechanism that enables a seamless handoff in such a system. The handoff is based on a metric that can be called a service level indicating metric (SLIM). A mechanism is described that enables SLIM calculation and seamless handoff. Simulations have demonstrated the optimality of the achieved terminal-sector alignment with the proposed SLIM-based handoff methodology. The implementation of this feature is described in an exemplary orthogonal frequency division multiplexing (OFDM) network.

Consider a multi-carrier network where the Base Stations (BSs) are transmitting on more than one carrier frequency. A network based on EVDO-Rev. B is one such system where multiple carriers are aggregated to enhance the sector throughput and user experience. Now consider the situation where the wireless terminals (WTs) are limited to single-carrier unlike the Rev. B case. This is the situation in one exemplary multi-carrier deployment scenario using OFDM. This implies that the terminal peak throughputs remain the same as in the single-carrier case. However, the sector throughput is still proportional to the number of carriers deployed. In addition, the capacity share of the WTs increases boosting user experience. A major advantage of limiting the WT capability to a single-carrier is that the terminal power consumption remains the same unlike a multi-carrier capable WT where the power consumption goes up roughly proportional to the number of carriers processed by the RF front end. Some existing WTs can be modified to support operation in multi-carrier systems through an upgrade that implements a new handoff methodology proposed herein. Other new wireless terminals may be originally implemented in accordance with the new handoff methodology proposed herein.

Given the advantages of a single-carrier WT in a multi-carrier network, the problem of selecting the appropriate carrier for a given WT is to be addressed for any distribution of the WTs across carriers in the network. A handoff mechanism is described in such a scenario that achieves the appropriate load-balancing to obtain a near optimal increase in sector throughput and user experience.

Exemplary system setup and the SLIM based handoff methodology are subsequently described. Simulation methods and the results are also described. An exemplary quality-of-service (QoS)-aware handoff methodology based on SLIM is also described. Implementation issues such as load information quantization and approximation of the SLIM function for reduced computational complexity are also described.

Handoff in an exemplary multi-carrier system and exemplary system set-up will now be described. Handoff in an exemplary OFDM multi-carrier system is facilitated by the broadcast of carrier related information by the base station (BS). The BS broadcasts may be not only the sector-specific carrier related information but also the carrier-related information from each of the neighboring sectors. The list of neighboring sectors itself is built up at the BS. Since there in no centralized Base-Station Controller in this exemplary-OFDM network, the neighbor list build up is useful and is exploited by to the multi-carrier handoff methodology.

The carrier related information that is broadcasted by the BS includes the carrier identity, the carrier power level, and the carrier load-factor. On exemplary OFDM embodiment supports up to 3 carriers, identified as carriers 0, 1, and 2. The WT can measure the sector strength by measuring the received power of the acquisition signal from a sector (one such OFDM acquisition signal is called a beacon, e.g., a single-tone beacon signal) and use the broadcasted carrier power level information to derive the signal-to-interference ratio (SIR) that the WT would potentially experience if it were to be connected to that sector and carrier. One may refer to a given combination of sector and carrier as a connection. Handoff to a connection can occur if the derived SIR for that connection is higher in comparison to the SIR on the current connection. However, with multiple carriers in a sector with each transmitted at the same power level, the SIR measurement on each of the carrier in a given sector will be near-identical making SIR-based handoff decision imprecise. In an embodiment, with multiple carriers at different power levels, if one hands off to the carrier of the highest power level this will resulting in a non-optimal configuration. So, in some embodiments, it is important that the handoff decision take into consideration factors beyond the potential SIR that the WT can experience.

An exemplary metric used for handoff decisions, referred to as service level indicating metric (SLIM) will now be described. The handoff in an exemplary OFDM multi-carrier system takes into account the broadcasted carrier load-factor, L, to calculate a metric that we refer to as the Service Level-Indicating Metric, or SLIM which will be indicative of the user experience of the WT on any given sector and carrier. One way to define SLIM is as follows:

$$SLIM = L \cdot \log_{10}(1 + \gamma \cdot SIR) \quad (1)$$

where SIR is the signal-to-interference ratio and L is some indication of the loading on the carrier of interest. One possibility is to define $L=1/(1+N_{users})$, where $N_{users}$ is the number of users. The users that are counted in $N_{users}$ can include each of the active users in the sector and carrier of interest.

One exemplary handoff method will now be described. The exemplary handoff method for the multi-carrier feature can be described as follows:

1. Calculate the SIR for each carrier in every sector whose acquisition signal can be detected and measured by the WT. If the SIR on a different sector on the same carrier as the current connection is stronger than the SIR of the current connection, then handoff to that sector and carrier.
2. Calculate the SLIM for the sector with the highest SIR in each of the carriers. If the SLIM on a different carrier is higher than the SLIM of the current connection, handoff to that sector and carrier.

This handoff method ensures that the WT is connected to the sector of maximum strength on a given carrier. Further, the method ensures that the WT is connected to the carrier on which it measures the highest SLIM. Connecting to the strongest sector on a given carrier irrespective of the load (and hence the SLIM) on that sector and carrier ensures that the WT transmit power for uplink connectivity is minimized and the Raise over Thermal (RoT) at the BSs is kept to the minimum, resulting in a stable system.

Various system simulations will now be described. System level simulations were performed to verify the performance of the SLIM-based handoff method in the downlink. One can compare the exemplary SLIM-based handoff method to an optimal path-loss based handoff method. The optimal path-loss based handoff method is to handoff to the sector to which the WT has the minimum path loss and then assign the WT to an optimal carrier within the sector based on an optimality criterion. Users assigned to a sector are ordered based on the path loss. The weakest users are allocated to the strongest carrier, the strongest users to the weakest carrier, and the rest are allocated to the third carrier. The optimal allocation boundaries are determined such that the sum log rate is maximized. The optimal path-loss based handoff method requires a centralized controller and hence is not practical.

In the simulations, it is assumed that there are three carriers in each sector. We consider two cases of carrier power profile. In equal powers configuration, all three carriers have the same transmit power. In the second case, for the base station sector, different carriers have different power profiles, the second strongest carrier is 6 dB weaker than that of the strongest carrier and the weakest carrier is 12 dB lower than the strongest carrier. Table 1 below shows the simulation results. Table 1 illustrates a throughput comparison. The numbers in parenthesis are increase of throughput relative to the equal power scheme.

TABLE 1

| | OFDM Multi-carrier equal power deployment scheme/ Path loss based handoff methodology or SLIM based handoff methodology | OFDM Multi-carrier-multi-power level deployment scheme/ Path loss-based handoff methodology | OFDM Multi-carrier-multi-power level deployment scheme/ SLIM-based handoff methodology |
|---|---|---|---|
| Mean sector throughput | 7549 kbps | 9053 kbps (19.9%) | 9240 kbps (22.4%) |
| Mean user throughput | 130 kbps | 150 kbps (15.4%) | 148 kbps (13.8%) |
| 90% user throughput | 250 kbps | 261 kbps (4.4%) | 261 kbps (4.4%) |
| Median user throughput | 99 kbps | 105 kbps (6.1%) | 105 kbps (6.1%) |
| 10% user throughput | 46 kbps | 61 kbps (32.6%) | 64 kbps (39.1%) |

For the case of 3 carriers of equal powers, path loss-based round robin allocation and SLIM-based allocation have virtually identical performance.

For the case of 3 carriers in the multi-carrier multi-power level configuration, optimal path loss-based handoff results in better throughput in low SIR regime but SLIM-based handoff results in better throughput in the mid-to-high SIR regime. Throughput performances are almost identical except for the low SIR regime. One may conclude that SLIM-based allocation scheme is nearly optimal in terms of throughput performance.

When comparing an equal power level multi-carrier OFDM deployment scheme with a multi-carrier multi-power level OFDM deployment scheme, the multi-carrier multi-power level OFDM deployment scheme improves SIR of cell-edge users for both path loss-based and SLIM-based schemes. One can see that there is a significant throughput performance gain for multi-carrier OFDM deployment scheme.

Quality of Service (QoS) aware handoff using SLIM will now be described. The handoff algorithm discussed above performs reasonable in the presence of just best effort traffic. In this section, an approach to extending the SLIM based handoff methodology to handle quality-of-service (QoS) traffic is described. To keep the discussion simple, consider the QoS criterion to be a fixed minimum rate. The proposed framework can be extended to other QoS parameters including packet delays. Users are grouped into QoS users (QU) with only QoS traffic and best effort users (BEU) with only best-effort traffic. The proposed framework can be extended to handle users with mixed traffic. The handoff method should try to ensure that the QoS criterion is satisfied for a QoS User.

The guiding principle behind this extension is that the scheduler will allocate resources strictly prioritizing QU over BEU. Therefore the handoff decision of a QU can be based on visibility into the fraction of time-frequency resources currently consumed for QoS support. A handoff decision of a BEU, on the other hand, can be based on visibility into the number of other BEUs with whom the resources have to be shared with.

To describe the exemplary handoff method we use the following notation. Let F denote the fraction of time-frequency resource (or OFDM tiles or OFDM tone-symbols)

being used for non QoS purposes, i.e., the unused resources plus those used to serve BEUs. Let $N_{BEU}$ and $N_{QU}$ be the number of BEUs and QUs, respectively, $R_{QU}$ be the minimum rate requirement for QUs (each of the QUs have same rate requirement) and BW is the total bandwidth.

Now note that for any QU i, $$\frac{R_{QU}}{BW \cdot \log_2(1 + SIR_i)}$$

is the fraction of resources used by the user on the current connection. Then it is easy to see that $$F = 1 - \frac{R_{QU}}{BW} \sum_{i \in S_{QU}} \frac{1}{\log_2(1 + SIR_i)}$$

where $S_{QU}$ is the set of QoS users.

In our QoS aware setup, this F along with $N_{BEU}$ is transmitted to the WT as the carrier load information. (Note that this is a departure from a previously presented definition of load where $1/(1+N_{users})$ is transmitted as load information.) We first describe the handoff methodology for QU. Each QU i forms a set $A_i$ of feasible connections that will be able to support its QoS requirement. More formally, a connection j belongs to $A_i$ if $$A_i = \{j : R_{QU} \leq BW \cdot F \cdot \log_2(1 + SIR_{ij})\},$$

where $SIR_{ij}$ is the SIR experienced by QU i if it were to be on connection j. Next for each connection in $A_i$, we calculate $SLIM_{QU}$ as an indication of the best-effort traffic performance if the QU were to make that connection:

$$SLIM_{QU} = \frac{BW \cdot F \cdot \log_2(1 + SIR_{ij}) - R_{QU}}{N_{BEU}}, j \in A_i.$$

The handoff methodology for the QU is as previously described with $SLIM = SLIM_{QU}$. The SLIM for BEU denoted by $SLIM_{BEU}$ is calculated as $$SLIM_{BEU} = \frac{BW \cdot F \cdot \log_2(1 + SIR_{ij})}{1 + N_{BEU}}.$$

The $SLIM_{BEU}$ is an indication of the best-effort traffic performance if the BEU were to handoff to a given connection. The handoff algorithm for the BEU is as described previously with $SLIM = SLIM_{BEU}$.

A simulation was performed to evaluate the described QoS awareness handoff. In the simulations, the ratio of the number of BEUs to the number of QUs is 2:1. The simulation results are very similar to the non-QoS case previously presented. In other words the QoS aware scheme not only ensures that QU connect to a sector/carrier pair that is able to support the users QoS requirement but does so without causing a drop in overall system throughput.

Various implementation issues will now be described including quantization of carrier load. The load information is an indication of the fraction of time-frequency resources, and affects the metric calculation and hence the performance of the handoff methodology. In one embodiment, a non-uniform quantization using finite bits is implemented to reduce messaging overhead. Specifically, it is quantized in exponential scale, that is, in the form of $2^{-n}$. For example, when using 3 bits, the load information is quantized to one of the following numbers:

$\{2^{-7}, 2^{-6}, 2^{-5}, 2^{-4}, 2^{-3}, 2^{-2}, 2^{-1}, 2^{-0}\} = \{0.0078125, 0.015625, 0.03125, 0.0625, 0.125, 0.25, 0.5, 1\}$

The input-output relationship of the quantizer is shown in drawing 900 of FIG. 9.

From simulation it was observed that using less than 3 bits to represent the load information degrades the performance significantly. Therefore in various embodiments, at least 3 bits are used to represent the load information.

An approximation of the SLIM function used in some embodiments will now be described. In the SLIM calculation, in one embodiment, we convert the SIR to linear scale since it is given in dB. Since converting from dB to linear scale is an expensive calculation in the WT, we use the following approximation to do without the scale conversion of the SIR.

$SIR^{dB} > 17$ dB $\log_{10}(1 + SIR^{linear}) \approx 0.1 \cdot SIR^{dB}$   i)

$0$ dB $< SIR^{dB} \leq 17$ dB $\log_{10}(1 + SIR^{linear}) \approx$ $0.1(2.93 + 0.6103 \cdot SIR^{dB} + 0.0135 \cdot (SIR^{dB})^2)$   ii)

$-20$ dB $< SIR^{dB} \leq 0$ dB $\log_{10}(1 + SIR^{linear}) \approx 0.0007325 \cdot (SIR^{dB} + 20)^2$   iii)

$SIR^{dB} \leq -20$ dB $\log_{10}(1 + SIR^{linear}) \approx 0$   iv)

Figure 11:
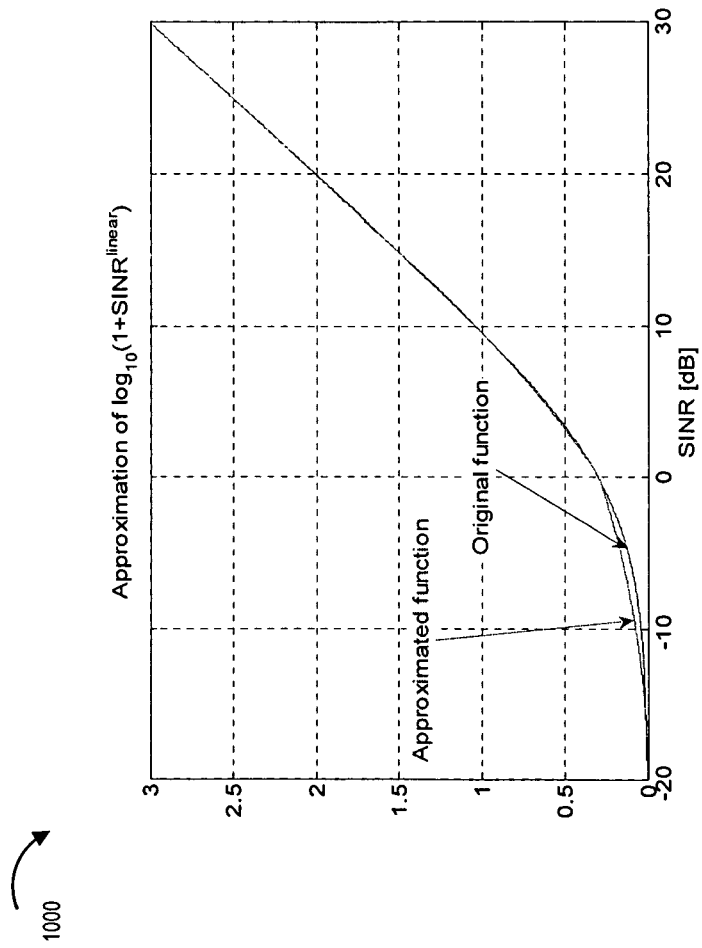
FIG. 11 illustrates graphically an approximation used for one exemplary service level indicating metric function.

Drawing 1000 of FIG. 11 illustrates the approximation graphically.

A handoff methodology for a multi-carrier system has been described to achieve the appropriate load-balancing to maximize the system throughput. The handoff methodology uses a metric called the service level indicating metric (SLIM) that combines the loading information with the signal quality represented by the SIR. The ideas developed here can apply to any multi-carrier or multi-channel network where the WT is limited to a single channel. In particular, in various OFDM schemes such as, e.g., 802.11, an access point can deploy as many as 3 non-overlapping channels and the WT handoff methodology can be driven by the framework developed here. The methods and apparatus described herein are also useful in systems where an access point, e.g., base station deploys more than three non-overlapping channels.

The following are the basic assumptions for the simulations. Cell layout and configurations.

Hexagonal grid 19-cell wrap around layout: Only the statistics of the users allocated to the inner ring are considered in order to minimize the imperfect wrap around configuration for the exemplary multi-carrier multi-power level OFDM deployment scheme.
3 sectors per cell
Cell-to-cell distance: 1 km
Minimum distance between the mobile terminal and the cell site: 35 m Antenna configurations
3 dB cutoff angle: $\angle 3$ dB=65°
Front-to-back loss: Am=32 dB Antenna pattern:

$$A(\theta) = -\min\left\{12 \cdot \left(\frac{\theta}{\theta_{3dB}}\right)^2, A_m\right\} \text{ [dB]}$$

Figure 12:
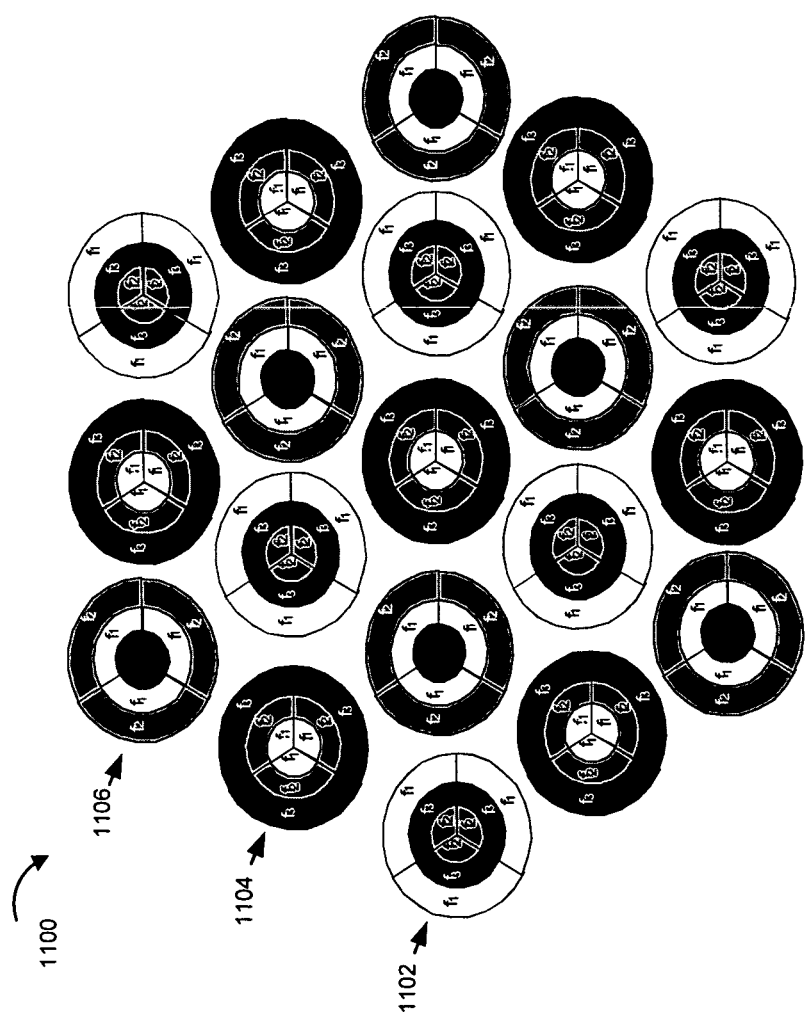
FIG. 12 illustrates an exemplary multi-carrier multi-power level multi-sector deployment scheme, used in some OFDM embodiments, in which utilizing indicator of resource fraction based handoff is beneficial.

Antenna height
  BS:$h_{BS}$=32 m
  MT:$h_{MT}$=1.5 m
Radio Configurations
  Carrier frequency:$f_c$=450 MHz
  BW per carrier: BW=113×11.25 kHz=1.271250 MHz
  Number of carriers: N=3 (equal powers or multi-power level)
    In equal powers configuration, the powers of all the carriers are identical.
    In multi-power level configuration, the power of the strongest carrier is 6 dB higher than that of the second strongest carrier and the power of the weakest carrier is 6 dB lower than that of the second strongest carrier.
Propagation
  Distance-dependent path loss:

$$PL(r) = 46.3 + 33.9 \cdot \log_{10}(f_c) -$$
$$13.82 \cdot \log_{10}(h_{BS}) + \{44.9 - 6.55 \cdot \log_{10}(h_{BS})\} \cdot \log_{10}(r) -$$
$$\{1.1 \cdot \log_{10}(f_c) - 0.7\} \cdot h_{MT} + \{1.56 \cdot \log_{10}(f_c) - 0.8\} \text{ [dB]}$$

r in km, $f_c$ in MHz, and $h_{BS}/h_{MT}$ in m.
  No shadowing.
Mobile Terminal Configurations
  Number of mobile terminals: 60 users per sector on average.
  Mobile terminals are dropped within the radius of the cell and are uniformly distributed (in terms of $r^2$) within each cell.
SIR Derivation
  Interference-limited scenario (background noise=0).
  SIR when connected to sector/carrier k:

$$SIR_k = \frac{PL_k}{\sum_{i \neq k} PL_i} \text{ [linear]}$$

where PL is the path loss in linear scale.
Throughput Calculation
  Throughput calculation is based on Shannon's capacity upper bound for Gaussian channel.
  We assume the resources are evenly allocated to the users within the same sector/carrier. Thus, the throughput for user n in sector/carrier k is calculated as follows:

$$TP_n = \frac{BW}{N_{users,k}} \log_2(1 + SIR_{n,k}) \text{ [bps]}$$

where $N_{users,k}$ is the number of users in sector/carrier k.
  Drawing 1100 of FIG. 12 illustrates an exemplary multi-carrier multi-power level multi-sector deployment scheme used in some OFDM embodiments. In this scheme each there are three-sector cells, with each sector having 3 attachment points. One attachment point corresponding to each carrier (f1, f2, f3) for each sector. Thus there are nine attachment points per cell. In some such embodiments the nine attachment points are part of a single base station, while in other embodiments, each attachment point or multiple attachment points may be grouped into a base station.

In the example of FIG. 12 there are three types of cells. In the first type of cell carrier frequency f1 is associated with the high power level, carrier frequency f3 is associated with the intermediate power level, and carrier frequency f2 is associated with the low power level. In the second type of cell carrier frequency f3 is associated with the high power level, carrier frequency f2 is associated with the intermediate power level, and carrier frequency f1 is associated with the low power level. In the third type of cell carrier frequency f2 is associated with the high power level, carrier frequency f1 is associated with the intermediate power level, and carrier frequency f3 is associated with the low power level. Exemplary cell 1102 is a cell of the first type; exemplary cell 1104 is a cell of the second type; exemplary cell 1106 is a cell of the third type.

The techniques of various embodiments may be implemented using software, hardware and/or a combination of software and hardware. Various embodiments are directed to apparatus, e.g., mobile nodes such as mobile access terminals, base stations including one or more attachment points, and/or communications systems. Various embodiments are also directed to methods, e.g., method of controlling and/or operating mobile nodes, base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

In various embodiments nodes described herein are implemented using one or more modules to perform the steps corresponding to one or more methods, for example, receiving a signal, determining a best connection for a carrier of interest, calculating a service level indicating metric for a current attachment point, calculating a service level indicating metric for an alternative attachment point, making a handoff decision. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications device, including a processor configured to implement one, multiple or all of the steps of one or more methods of the invention.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node.

The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

In some embodiments, the processor or processors, e.g., CPUs, of one or more devices, e.g., communications devices such as wireless terminals are configured to perform the steps of the methods described as being as being performed by the communications device. Accordingly, some but not all embodiments are directed to a device, e.g., communications device, with a processor which includes a module corresponding to each of the steps of the various described methods performed by the device in which the processor is included. In some but not all embodiments a device, e.g., communications device, includes a module corresponding to each of the steps of the various described methods performed by the device in which the processor is included. The modules may be implemented using software and/or hardware.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods.

What is claimed is:

1. A method of making handoff determinations in an access terminal, the method comprising:
    receiving a plurality of indicators, each indicator corresponding to a different attachment point in a plurality of attachment points, each indicator indicating a fraction of communications resources available at said corresponding attachment point not utilized for QoS service;
    determining whether said access terminal is operating in a best effort mode of data traffic operation or operating in a QoS mode of data traffic operation; and
    making a handoff decision based on received indicators corresponding to different attachment points, said step of making a handoff decision including:
        while operating in the QoS mode of data traffic operation:
            i) identifying a set of attachment points which can provide connections satisfying QoS requirements of the access terminal; and
            ii) selecting a connection with an attachment point from the set of identified attachment points; and
        while operating in said best effort mode of data traffic operation making a first handoff decision including:
            selecting a connection having the greatest potential best effort capacity.

2. The method of claim 1, wherein the communication resources are for communicating traffic data.

3. The method of claim 1, wherein said step of identifying attachment points which can provide connections satisfying QoS requirements is based on the fraction of communications resources available at individual attachment points not utilized for QoS service as indicated by received indicators corresponding to the individual attachment points.

4. The method of claim 1, wherein said step of identifying attachment points which can provide connections satisfying QoS requirements is based on power reference level signals received from each individual attachment point which is under consideration.

5. The method of claim 1, wherein selecting a connection with an attachment receiver point from the identified set of attachment points includes:
    selecting the attachment point corresponding to the connection having the greatest capacity available for communicating best effort traffic between the access terminal and the attachment point.

6. The method of claim 1, wherein selecting a connection with an attachment point from the identified set of attachment points includes:
    selecting the attachment point having the largest capacity after satisfying QoS requirements.

7. The method of claim 1, further comprising:
    receiving information indicating the number of best effort users being serviced by the individual attachment points in said identified set of attachment points; and
    wherein said selecting a connection with an attachment point from the identified set is performed as a function of the number of best effort users being serviced by each of the individual attachment points.

8. The method of claim 1, further comprising:
    receiving from an attachment point with which said access terminal has a connection, a signal indicating an access terminal mode of operation, said mode of operation being one of said best effort mode of data traffic operation and a QoS mode of data traffic operation.

9. The method of claim 8, further comprising:
    prior to receiving said signal indicating an access terminal mode of operation, transmitting a signal indicating a desired mode of access terminal operation to an attachment point with which said access terminal currently has a connection, said desired mode of access terminal operation being one of said best effort mode of data traffic operation and a QoS mode of data traffic operation.

10. The method of claim 1, wherein one of said QoS requirements is a minimum data rate requirement.

11. The method of claim 1, wherein one of said QoS requirements is a maximum queuing delay indicating a maximum time data can be stored in a queue prior to transmission.

12. The method of claim 1, further comprising:
    receiving a power reference level signal from each of the attachment points.

13. An access terminal comprising:
    a wireless receiver for receiving a plurality of indicators, each indicator corresponding to a different attachment point in a plurality of attachment points, each indicator indicating a fraction of communications resources available at said corresponding attachment point not utilized for QoS service;

a mode determination module for determining whether said access terminal is in a best effort mode of data traffic operation or a QoS mode of data traffic operation; and a handoff decision module for making a handoff decision based on received indicators corresponding to different attachment points, said handoff decision module including:

i) an attachment point preliminary screening module for identifying a set of attachment points which can provide connections satisfying QoS requirements of the access terminal while operating in said QoS mode of data traffic operation;

ii) an attachment point selection module for selecting a connection with an attachment point from the set of identified attachment points for use while in said QoS mode of data traffic operation; and iii) a best effort selection module for selecting a connection having the greatest potential best effort capacity while operating in said best effort mode of data traffic operation.

14. The access terminal of claim 13, wherein the communication resources which for communicating traffic data.

15. The access terminal of claim 13, wherein said attachment point preliminary screening module bases its identifications on the fraction of communications resources available at individual attachment points not utilized for QoS service as indicated by received indicators corresponding to the individual attachment points.

16. The access terminal of claim 13, wherein said attachment point preliminary screening module bases its identification on power reference level signals received from each individual attachment point which is under consideration.

17. The access terminal of claim 13, wherein said attachment point selection module selects the attachment point corresponding to the connection having the greatest capacity available for communicating best effort traffic between the access terminal and the attachment point.

18. The access terminal of claim 13, wherein said attachment point selection module selects the attachment point having the largest capacity after satisfying quality of service requirements.

19. The access terminal of claim 13, wherein said wireless receiver module is also for receiving information indicating the number of best effort users being serviced by the individual attachment points in said identified set of attachment points; and wherein said attachment point selection module selects a connection with an attachment point from the identified set as a function of the number of best effort users being serviced by each of the individual attachment points.

20. The access terminal of claim 13, wherein said wireless receiver module is also for receiving from an attachment point with which said access terminal has a connection, a signal indicating an access terminal mode of operation, said mode of operation being one of said best effort mode of data traffic operation and said QoS mode of data traffic operation.

21. The access terminal of claim 20, further comprising:

an access terminal mode request module for generating a signal indicating a desired mode of access terminal operation; and a wireless transmitter module for transmitting said signal indicating a desired mode of access terminal operation to an attachment point with which said access terminal currently has a connection, said desired mode of access terminal operation being one of said best effort mode of data traffic operation and said QoS mode of data traffic operation.

22. The access terminal of claim 13, wherein one of said QoS requirements is a minimum data rate requirement.

23. The access terminal of claim 12, wherein one of said QoS requirements is a maximum queuing delay indicating a maximum time data can be stored in a queue prior to transmission.

24. The access terminal of claim 13, wherein said wireless receiver module is also for receiving a power reference level signal from each of the attachment points.

25. An access terminal comprising:

wireless receiver means for receiving a plurality of indicators, each indicator corresponding to a different attachment point in a plurality of attachment points, each indicator indicating a fraction of communications resources available at said corresponding attachment point not utilized for QoS service;

means for determining whether said access terminal is in a best effort mode of data traffic operation or a QoS mode of data traffic operation; and handoff decision means for making a handoff decision based on received indicators corresponding to different attachment points, said handoff decision means including:

i) means for identifying a set of attachment points which can provide connections satisfying QoS requirements of the access terminal while operating in said QoS mode of data traffic operation;

ii) means for selecting a connection with an attachment point from the set of identified attachment points for use while in said QoS mode of data traffic operation; and iii) means for selecting a connection having the greatest potential best effort capacity while operating in said best effort mode of data traffic operation.

26. The access terminal of claim 25, wherein the communication resources are for communicating traffic data.

27. The access terminal of claim 25, wherein said attachment point preliminary screening means bases its identifications on the fraction of communications resources available at individual attachment points not utilized for QoS service as indicated by received indicators corresponding to the individual attachment points.

28. The access terminal of claim 25, wherein said attachment point preliminary screening means bases its identification on power reference level signals received from each individual attachment point which is under consideration.

29. A computer program product for use in an access terminal, comprising:

non-transitory computer-readable medium comprising:

code for causing a computer to receive a plurality of indicators, each indicator corresponding to a different attachment point in a plurality of attachment points, each indicator indicating a fraction of communications resources available at said corresponding attachment point not utilized for QoS service;

code for causing a computer to determine whether said access terminal is operating in a best effort mode of data traffic operation or operating in a QoS mode of data traffic operation; and code for causing a computer to make a handoff decision based on received indicators corresponding to different attachment points, said code for causing a computer to make a handoff decision including:

code for causing a processor, while operating in said QoS mode of data traffic operation, to:
i) identify a set of attachment points which can provide connections satisfying QoS requirements of the access terminal; and
ii) select a connection with an attachment point from the set of identified attachment points; and code for causing a processor, while operating in said best effort mode of data traffic operation, to:
select a connection having the greatest potential best effort capacity.

30. The computer program product of claim 29, wherein the communication resources are for communicating traffic data.

31. The computer program product of claim 29, wherein said code for causing a computer to identify attachment points which can provide connections satisfying QoS requirements uses a fraction of communications resources available at individual attachment points not utilized for QoS service indicated by received indicators corresponding to the individual attachment points.

32. An apparatus comprising:
a processor configured to:
receive a plurality of indicators, each indicator corresponding to a different attachment point in a plurality of attachment points, each indicator indicating a fraction of communications resources available at said corresponding attachment point not utilized for QoS service;
determine whether said apparatus is operating in a best effort mode of data traffic operation or operating in a QoS mode of data traffic operation; and
make a handoff decision based on received indicators corresponding to different attachment points, as part of being configured to make a handoff decision said processor being configured to:
i) identify a set of attachment points which can provide connections satisfying QoS requirements of the apparatus while said apparatus operates in said QoS mode of data traffic operation; and
ii) select a connection with an attachment point from the set of identified attachment points while said apparatus operates in said QoS mode of data traffic operation; and
iii) select a connection having the greatest potential best effort capacity while said apparatus operates in said best effort mode of data traffic operation.

33. The apparatus of claim 32, wherein the communication resources are for communicating traffic data.

34. The apparatus of claim 32, wherein said processor configuration to identify attachment points which can provide connections satisfying QoS requirements includes being configured to use the indicated fraction corresponding to each individual AP which is under consideration for inclusion in said set.

* * * * *